(12) United States Patent
Jamali et al.

(10) Patent No.: US 11,435,641 B1
(45) Date of Patent: Sep. 6, 2022

(54) SWITCHABLE RETARDATION DEVICE WITH REDUCED RESIDUAL RETARDATION

(71) Applicant: META PLATFORMS TECHNOLOGIES, LLC, Menlo Park, CA (US)

(72) Inventors: Afsoon Jamali, Redmond, WA (US); Arman Boromand, Redmond, WA (US); Jasmine Soria Sears, Kirkland, WA (US); Sandro Pintz, Menlo Park, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/137,916

(22) Filed: Dec. 30, 2020

(51) Int. Cl.
*G02F 1/139* (2006.01)
*G02F 1/133* (2006.01)

(52) U.S. Cl.
CPC ........ *G02F 1/1396* (2013.01); *G02F 1/13306* (2013.01)

(58) Field of Classification Search
CPC ..................................... G02F 1/1396
See application file for complete search history.

(56) References Cited

U.S. PATENT DOCUMENTS

2018/0335630 A1\* 11/2018 Lu ........................ G02F 1/13471
2020/0159055 A1\* 5/2020 Robinson .............. G02F 1/0311

\* cited by examiner

*Primary Examiner* — Edmond C Lau
(74) *Attorney, Agent, or Firm* — Morgan, Lewis & Bockius LLP

(57) ABSTRACT

A switchable optical retardation device includes a switchable retardation element including liquid crystals and an electrical driver circuit. While in a first state, the switchable retardation element modifies light transmitted through the switchable retardation element by causing a phase shift of a first retardation angle. While in a second state, the switchable retardation element modifies the light transmitted through the switchable retardation element by causing a phase shift of a second retardation angle distinct from the first retardation angle. The electrical driver circuit provides a first voltage for placing the switchable retardation element in the first state and a second voltage for placing the switchable retardation element in the second state. The first voltage is greater than the second voltage, the second voltage is a non-zero voltage, and the electrical driver circuit alternatingly provides the first voltage and the second voltage with a predefined frequency.

12 Claims, 12 Drawing Sheets

250 ⬅

```
┌─────────────────────────────────────┐
│ 252 Provide by a driver circuit a first voltage
│ for placing a switchable retarder in a first
│ state.
└─────────────────────────────────────┘
                  │
┌─────────────────────────────────────┐
│ 254 Switch the switchable retarder to the first
│ state.
└─────────────────────────────────────┘
                  │
┌─────────────────────────────────────┐
│ 256 Transmit light through the switchable
│ retarder while the switchable retarder is in the
│ first state.
└─────────────────────────────────────┘
                  │
┌─────────────────────────────────────┐
│ 258 Provide by the driver circuit a second
│ voltage for placing the switchable retarder in a
│ second state.
└─────────────────────────────────────┘
                  │
┌─────────────────────────────────────┐
│ 260 Switch the switchable retarder to the
│ second state.
└─────────────────────────────────────┘
                  │
┌─────────────────────────────────────┐
│ 262 Transmit light through the switchable
│ retarder while the switchable retarder is in the
│ second state.
└─────────────────────────────────────┘
```

Figure 2B

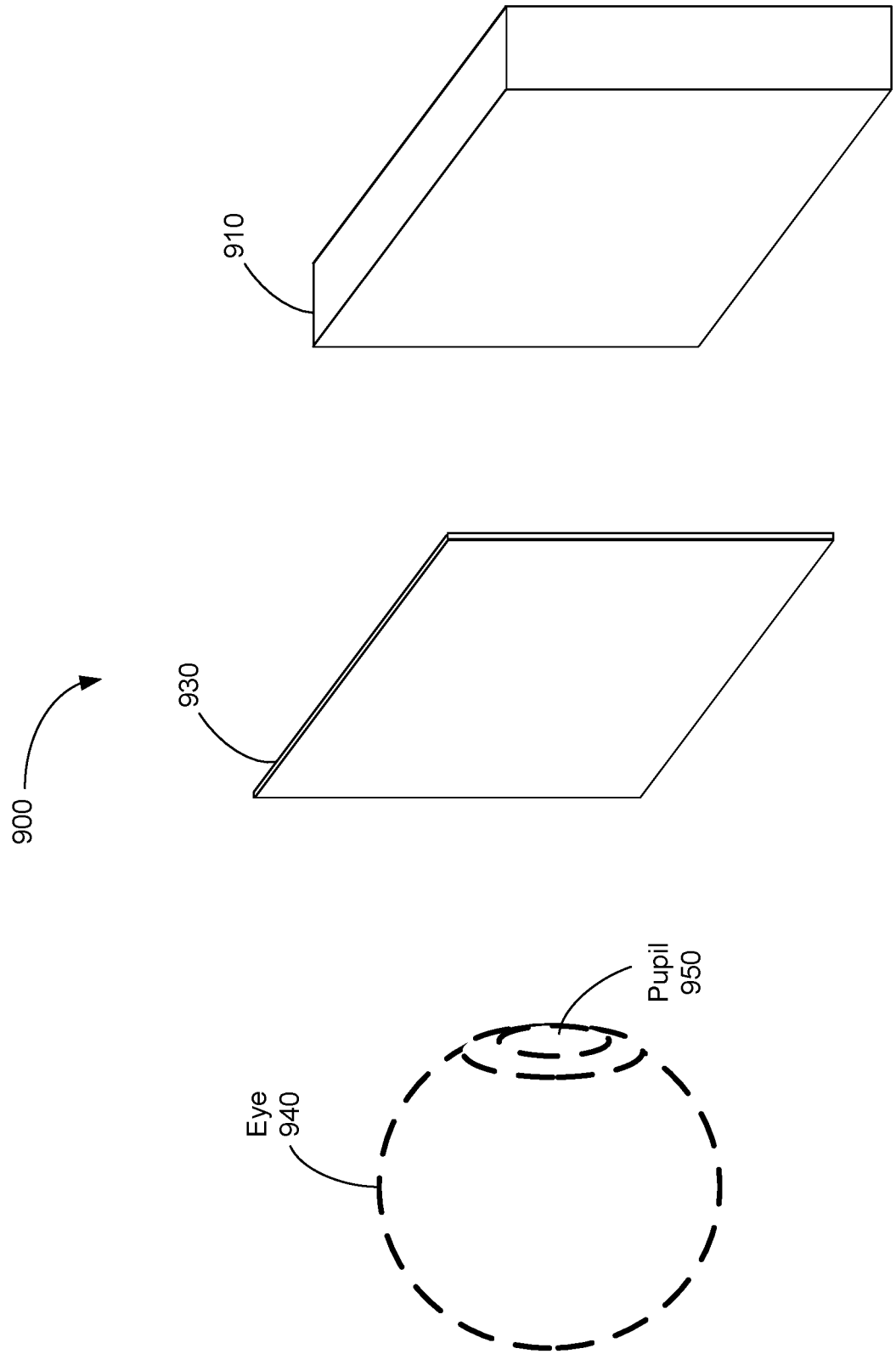

SWITCHABLE RETARDATION DEVICE WITH REDUCED RESIDUAL RETARDATION

TECHNICAL FIELD

This relates generally to retardation devices, and more specifically to switchable retardation devices.

BACKGROUND

Switchable optical retarders including liquid crystals may be used in many optical devices requiring the ability to rapidly change polarization of light. Switchable optical retarders including liquid crystals may be used, for example, in head-mounted display devices. Generally, a liquid crystal switchable optical retarder (e.g., a switchable half-wave plate) is operable between a state in which light is transmitted with a small change to the polarization of the light and a state in which the light is transmitted with a large change to the polarization of the light (e.g., converting the polarization from a right-handed circular polarization toward a left-handed circular polarization, or vice versa). However, conventional switchable optical retarders including liquid crystals (e.g., twisted nematic liquid crystal cells) include manufacturing defects and/or other limitations so that the transmitted light often has elliptical polarization, which requires additional components for correction, in either state or both states of the switchable optical retarder.

However, the use of additional optical components increase the size and weight of the switchable optical retarder, which are not desirable in mobile or portable applications. Accordingly, there is a need for improved switchable optical retarders.

SUMMARY

The above deficiencies and other problems associated with conventional liquid crystal switchable optical retarders are reduced or eliminated by the disclosed switchable optical retarder device including a switchable liquid crystal retardation element and an electrical driver circuit for operating the switchable liquid crystal retardation element. For example, the disclosed optical devices and methods reduce or eliminate residual retardation, which adversely affect the efficiency of the switchable optical retarders and cause undesirable optical artifacts when used in display devices.

In accordance with some embodiments, a switchable optical retardation device includes a switchable retardation element and an electrical driver circuit. The switchable retardation element includes liquid crystals and is switchable between different states including a first state and a second state. While in the first state, the switchable retardation element modifies light transmitted through the switchable retardation element by causing a phase shift of a first retardation angle. While in the second state, the switchable retardation element modifies the light transmitted through the switchable retardation element by causing a phase shift of a second retardation angle distinct from the first retardation angle. The electrical driver circuit is electrically coupled with the switchable optical retardation element for providing a first voltage for placing the switchable retardation element in the first state and a second voltage for placing the switchable retardation element in the second state. The first voltage is greater than the second voltage, the second voltage is a non-zero voltage, and the electrical driver circuit alternatingly provides the first voltage and the second voltage with a predefined frequency.

In accordance with some embodiments, an optical assembly includes the switchable optical retardation device described herein and a polarization-selective optical element optically coupled with the switchable optical retardation device. The optical assembly is for projecting, when the switchable optical retardation device is in the first state, light having a first polarization in a first direction and projecting, when the switchable optical retarder is in the second state, light having a second polarization orthogonal to the first polarization, in a second direction distinct from the first direction.

In accordance with some embodiments, an electrical driver circuit for operating a switchable optical retarder element includes a voltage modulator and one or more controllers for operating the voltage modulator. The voltage modulator is in electrical connection with the switchable optical retarder element. The switchable optical retarder element includes liquid crystals and is switchable between different states including a first state and a second state. While in the first state, the switchable retardation element modifies light transmitted through the switchable retardation element by causing a phase shift of a first retardation angle. While in the second state, the switchable retardation element modifies the light transmitted through the switchable retardation element by causing a phase shift of a second retardation angle distinct from the first retardation angle. The electrical driver circuit provides a first voltage for placing the switchable retardation element in the first state and a second voltage for placing the switchable retardation element in the second state. The first voltage is greater than the second voltage, the second voltage is a non-zero voltage, and the electrical driver circuit alternatingly provides the first voltage and the second voltage with a predefined frequency.

In accordance with some embodiments, a method for operating a switchable optical retarder element is performed at an electrical driver circuit. The electrical driver circuit includes a voltage modulator and one or more controllers for operating the voltage modulator. The voltage modulator is in electrical connection with the switchable optical retarder element. The switchable optical retarder element includes liquid crystals and is switchable between different states including a first state and a second state. While in the first state, the switchable retardation element modifies light transmitted through the switchable retardation element by causing a phase shift of a first retardation angle. While in the second state, the switchable retardation element modifies the light transmitted through the switchable retardation element by causing a phase shift of a second retardation angle distinct from the first retardation angle. The method includes providing, by the electrical driver circuit, a first voltage for placing the switchable retardation element in the first state and a second voltage for placing the switchable retardation element in the second state. The first voltage is greater than the second voltage, the second voltage is a non-zero voltage, and the electrical driver circuit alternatingly provides the first voltage and the second voltage with a predefined frequency.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 2B is a flow diagram illustrating a method of operating the switchable retarder device of FIG. 2A in accordance with some embodiments.

FIG. 9 is an isometric view of a display device in accordance with some embodiments.

Figure 1A:
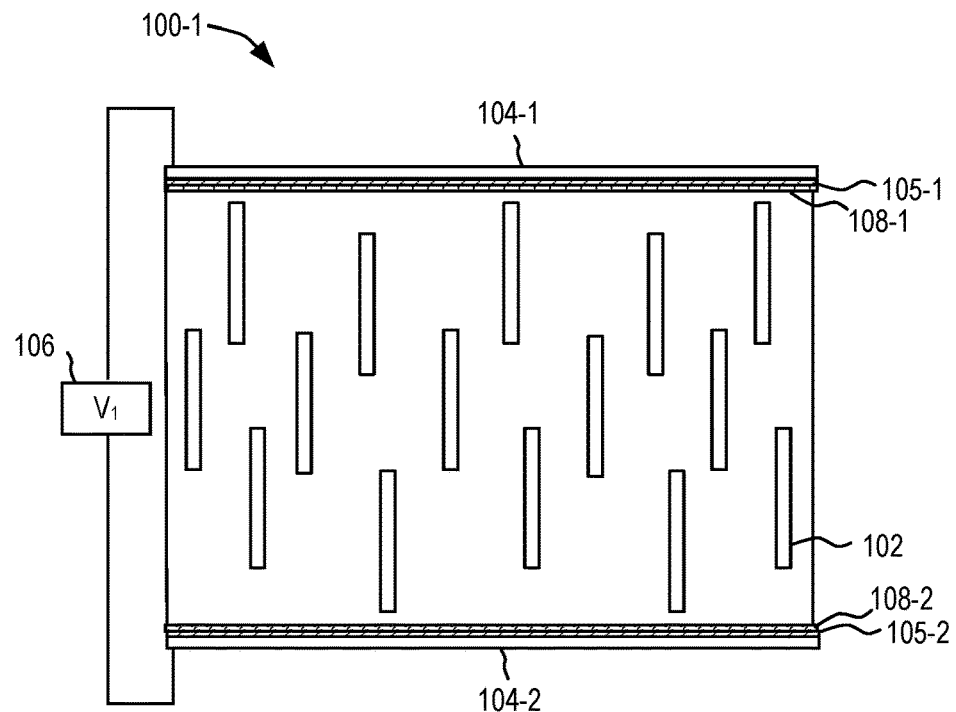
FIGS. 1A and 1B are schematic diagrams illustrating a switchable retarder in accordance with some embodiments.

These figures are not drawn to scale unless indicated otherwise.

DETAILED DESCRIPTION

Switchable (or tunable) optical retarders are used in a variety of optical devices including head-mounted display devices. In particular, liquid crystal switchable optical retarders (e.g., twisted nematic liquid crystal cells) are desirable because they are capable of operating at low voltages, are cost-effective and reliable, have a long lifetime and low power consumption, and are suitable for mass manufacturing.

In some configurations, a twisted nematic liquid crystal cell is used as a switchable optical retarder. A twisted nematic liquid crystal cell refers to an optical element including nematic liquid crystals that are arranged in a twisted configuration (e.g., a helical configuration). The alignment of the liquid crystals is changed by applying an electric field across the liquid crystals, and the liquid crystals may realign in the twisted configuration when no electric field is applied. In an ideal twisted nematic liquid crystal cell, the liquid crystals are oriented parallel to a surface of the cell and arranged in helical or twisted configurations when in a nematic state (e.g., while substantially no voltage is applied across the cell). Furthermore, in the ideal twisted nematic liquid crystal cell, the liquid crystals align substantially linearly along an electric field generated by a voltage applied across the cell. However, liquid crystal switchable optical retarders suffer from manufacturing defects and other physical limitations associated with liquid crystals, which cause disorderly orientation of the liquid crystals (e.g., the liquid crystals have an imperfect alignment). For example, when no voltage is applied across a liquid crystal switchable optical retarder, the liquid crystals may not align perfectly parallel to a surface of the optical retarder. Instead, the liquid crystals may align non-parallel to the surface of the optical retarder thereby causing polarization conversion that does not correspond to the polarization rotation by 90 degrees. In addition, when a voltage is applied across the liquid crystal switchable optical retarder, the liquid crystals may not align perfectly perpendicular to the surface of the optical retarder. Instead, the liquid crystals may align in such a way that they cause some degree of polarization conversion to light transmitted through the optical retarder. In such cases, instead of transmitting light having a circular polarization in response to receiving light having a circular polarization, a switchable retarder may transmit light having an elliptical polarization (e.g., both when no voltage is applied and when a sufficient voltage is applied). This effect is known as residual retardation. The retardation deviation caused by residual retardation may range from about 20 degrees to about 40 degrees across the visible wavelength range. The residual retardation reduces the efficiency of the switchable optical retarders and may lead to undesirable optical artifacts. For example, the residual retardation may cause optical artifacts (e.g., ghost images) when the switchable retarder is operated together with one or more polarization-selective optical elements (e.g., polarization-selective gratings and/or lenses) in a display device. In some configurations, the switchable optical retarder includes two liquid crystal cells (e.g., dual twisted nematic liquid crystal cells). In some configurations, the two liquid crystal cells have the same handedness. In some configurations, the two liquid crystal cells have opposite handedness. In some configurations, the two liquid crystal cells have the same twist angle. In some configurations, the two liquid crystal cells have different twist angles. In some configurations, the two liquid crystal cells have different thicknesses. In some configurations, the two liquid crystal cells have a same thickness (e.g., 1, 1.5, 2, 2.5, 3, 3.5, 4, 4.5, or 5 μm or a value within a range between any two aforementioned values).

The disclosed liquid crystal switchable optical retardation device have a reduced residual retardation. The device includes a switchable retardation element including liquid crystals and an electrical driver circuit configured to operate the switchable retardation element. In particular, the electrical driver circuit is configured to provide a first (high) voltage for placing the liquid crystals of the switchable retardation element in a linear arrangement along an electric field generated by the first voltage. The electrical driver is also configured to provide a second (low, non-zero) voltage for placing the liquid crystals in a helical (or twisted) arrangement so that the liquid crystals are substantially parallel to a surface of the switchable retardation element.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first angle could be termed a second angle, and, similarly, a second angle could be termed a first angle, without departing from the scope of the various described embodiments. The first angle and the second angle are both angles, but they are not the same angle. Similarly, a first direction could be termed a second direction, and, similarly, a second direction could be termed a first direction, without departing from the scope of the various described embodiments. The first direction and the second direction are both directions, but they are not the same direction.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1B:
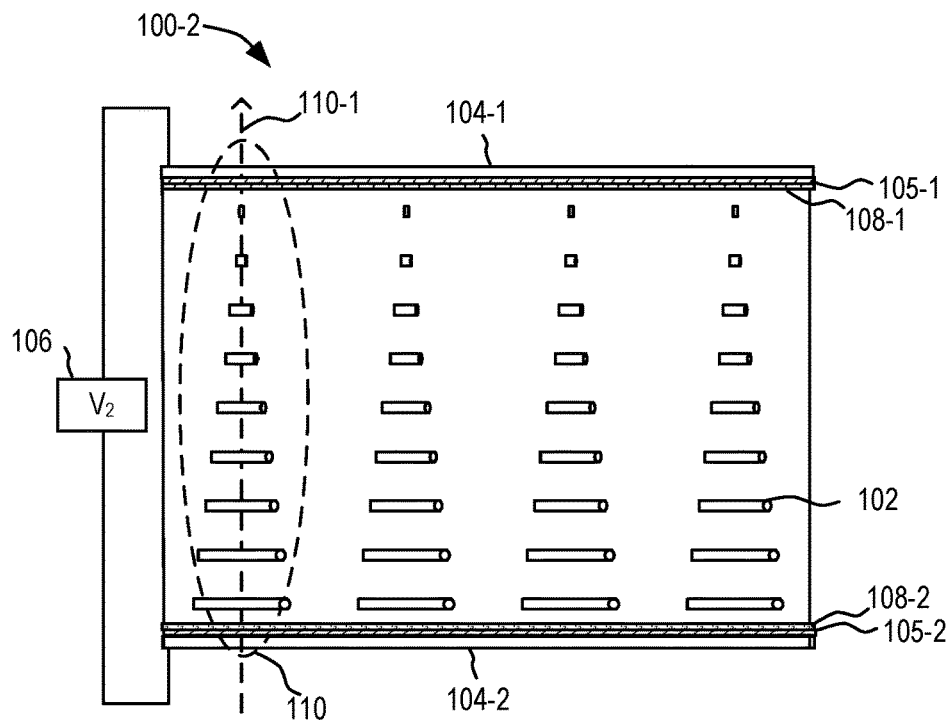

FIGS. 1A-1B are schematic diagrams illustrating switchable retarder 100 in accordance with some embodiments. In some embodiments, switchable retarder 100 includes a twisted nematic liquid crystal cell. As shown in FIG. 1A, switchable retarder 100 includes liquid crystals (e.g., liquid crystals 102) disposed between two substrates (e.g., substrates 104-1 and substrate 104-2). In some embodiments, substrates 104-1 and substrate 104-2 are parallel or substantially parallel to each other. In some embodiments, substrates 104-1 and 104-2 include, or are coupled with, one or more electrodes (e.g., electrode 105-1 on substrate 104-1 and electrode 105-2 on substrate 104-2). In some embodiments, the one or more electrodes include conducting thin films (e.g., indium tin oxide (ITO) films). The one or more electrodes may be used for applying a voltage across at least a portion of switchable retarder 100 to change the orientation and arrangement of liquid crystals 102. Switchable retarder 100 is electrically coupled with an electrical driver circuit including a voltage modulator (e.g., voltage modulator 106). In some embodiments, the driver circuit is configured to operate switchable retarder 100 by controlling and adjusting the voltage applied across at least a portion of switchable retarder 100. In some embodiments, the voltage modulator 106 is operated to control and adjust the voltage and/or frequency of an electric circuit across switchable retarder 100.

As shown in FIGS. 1A and 1B, switchable retarder 100 is operable in different states including a first state (e.g., as represented by switchable retarder 100-1 illustrated in FIG. 1A) and a second state (e.g., as represented by switchable retarder 100-2 illustrated in FIG. 1B) by adjusting the voltage applied across switchable retarder 100. In general, while a sufficiently high voltage is applied across switchable retarder 100, liquid crystals 102 having a rod-like shape are aligned linearly or substantially linearly along an electric field created by the voltage. As shown in FIG. 1A, the electrical driver circuit applies a first voltage (e.g., voltage $V_1$) across switchable retarder 100-1 thereby placing switchable retarder 100-1 in the first state. In FIG. 1A, liquid crystals 102 having the rod-like shape are aligned substantially linearly along the electric field generated by the applied voltage. In some embodiment, liquid crystals 102 are aligned substantially perpendicular to substrate 104-1 and/or substrate 104-2. In some embodiments, the first voltage is greater than 10 V, the first voltage is greater than 15 V, greater than 16 V, greater than 17 V, greater than 18 V, greater than 19 V, greater than 20 V, greater than 25 V, or greater than 30 V. However, a person having ordinary skill in the art would understand that other voltages may be used. The voltage sufficient to align liquid crystals 102 along the generated electric field depends on a distance between electrodes 105-1 and 105-2. In some configurations, the first voltage was selected to provide an electric field of 1, 2, 3, 4, 5, 6, 7, 8, 9, or 10 V/micrometer, or within a range between any two of the aforementioned values. When switchable retarder 100-1 is in the first state and when liquid crystals 102 are aligned linearly, switchable retarder 100 maintains (e.g., does not change or modify) polarization of light transmitted through switchable retarder 100).

FIG. 1B illustrates switchable retarder 100-2 in a second state. The second state is different from the first state. The first state and the second state are operated alternatively (e.g., the first state and the second state are not operated concurrently). In some embodiments, the second state corresponds to a twisted nematic state.

As described above, in an ideal twisted nematic state, liquid crystals 102 having the rod-like shape should be aligned parallel to a surface of switchable retarder 100 (e.g., parallel to substrate 104-1 and/or substrate 104-2), as shown in FIG. 1B. Furthermore, in the twisted nematic state, liquid crystals 102 are arranged in helical (or twisted) structures (e.g., structures 110) defining helical or twist axes (e.g., axes 110-1) substantially orthogonal to substrate 104-1 and/or substrate 104-2. In order to reduce the retardation deviation, while in the second state, a (low) second voltage (e.g., $V_2$) is applied across switchable retarder 100-2. Voltage $V_2$ is a non-zero voltage (e.g., voltage $V_2$ has a positive or negative value that is different from zero). As used herein, the term "value" used in association with "a voltage" may refer to the absolute value of an applied voltage that is independent of the sign of the applied voltage. Voltage $V_1$ has a value greater than voltage $V_2$ (e.g., voltage $V_1$ is greater than 15 V while voltage $V_2$ ranges from 1 V to 15 V). Voltage $V_2$ is not sufficiently high to cause liquid crystals 102 to align linearly along an electric field. However, voltage $V_{2\ may}$ correct for the misalignment of liquid crystals 102 while in the second state so that the residual retardation is reduced. Without limiting the scope of the claims, it is believed that this may be achieved by placing liquid crystals 102 in orientations substantially perpendicular to a surface of switchable retarder 100-2 (e.g., substrates 104-1 and 104-2). In some embodiments, voltage $V_2$ has a value ranging from 1 V to 15 V. In some embodiments, voltage $V_2$ has a value ranging from 2 V to 12 V, from 3 V to 10 V, from 4 V to 9 V, from 5 V to 8 V, or from 6 V to 7 V. In some embodiments, the second voltage has a value corresponding to substantially 5 V. In some embodiments, the second voltage has a value corresponding to substantially 6 V. In some embodiments, the second voltage has a value corresponding to substantially 7 V. In some configurations, the second voltage is selected to provide an electric field of 0.5, 0.8, 1.0, 1.2, 1.5, 1.8, 2.0, 2.2, or 2.5 V/micrometer, or within a range between any two of the aforementioned values.

In some embodiments, switchable retarder 100 includes one or more alignment layers for forming structures 110. For example, substrate 104-1 includes, or is coupled with, alignment layer 108-1 and substrate 104-2 includes, or is coupled with, alignment layer 108-2. In some embodiments, alignment layers 108-1 and 108-2 include photoalignment layers and/or patterned alignment layers. Alignment layers 108-1 and 108-2 are configured to interact with liquid crystals 102 in a solution phase so that liquid crystals 102 form structures 110. For example, because of an interaction with an alignment layer, liquid crystals 102 interacting with the alignment layer are unable to rotate freely and are instead pinned (anchored) at the alignment layer at a particular orientation. Alignment layer 108-1 includes patterns or photoalignment molecules configured to pin liquid crystals 102 in a first direction and alignment layer 108-2 includes patterns or photoalignment molecules configured to pin liquid crystals 102 in a second direction distinct from the first direction. For example, the second direction is oriented at a 90-degree angle with respect to the first direction. Thereby, liquid crystals 102 are assisted to form structures 110 that twist around axes 110-1 (e.g., helical or twist axes). Axes 110-1 are substantially perpendicular to the alignment layers while liquid crystals 102, having the rod-like shape, are parallel or substantially parallel to the alignment layers.

Accordingly, while in the first state, switchable retarder 100-1 maintains polarization of light transmitted through switchable retarder 100-1 and while in the second state, switchable retarder 100-2 acts as a retarder so that switchable retarder 100-2 modifies light transmitted through switchable retarder 100-2 by causing a particular phase shift. For example, switchable retarder 100-2 in the second state causes a phase shift by the particular retardation angle for a first portion of light (e.g., ordinary waves) relative to another portion of the light (e.g., extraordinary waves). In some embodiments, switchable retarder 100-1 in the second state operates as a half-wave plate (e.g., a 180-degree phase shift) or a quarter-wave plate (e.g., a 90-degree phase shift).

As explained above, switchable retarder 100 is operated by an electrical driver circuit. The electrical driver circuit is configured to control and adjust the voltage and/or frequency of an electric current applied across switchable retarder 100 in order to place switchable retarder 100 to the first state and the second state. In particular, the electrical driver circuit adjusts the voltage and/or frequency to reduce residual retardation. A switchable retardation device with a reduced residual retardation and a method of operating such device are described with respect to FIGS. 2A and 2B.

Figure 2A:
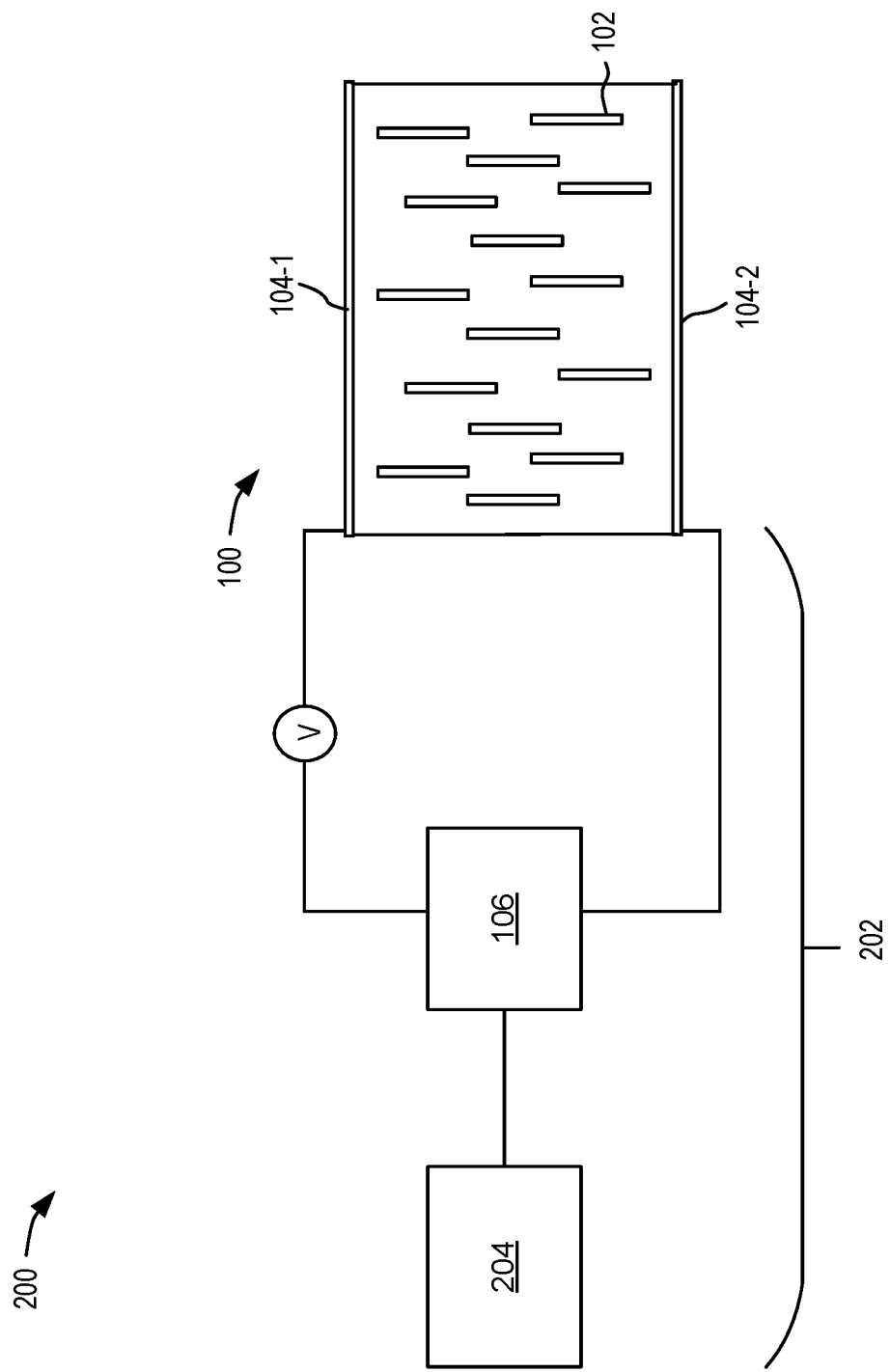
FIG. 2A is a schematic diagram illustrating a switchable retarder device in accordance with some embodiments.

FIG. 2A is a schematic diagram illustrating switchable retardation device 200 in accordance with some embodiments. Switchable retardation device 200 includes switchable retarder 100 and driver circuit 202 (e.g., an electrical driver circuit) including voltage modulator 106 and one or more controllers 204. Voltage modulator 106 is electrically coupled with switchable retardation device 200 and is configured to adjust and control a voltage (V) and/or frequency (e.g., Hz) applied across at least a portion of switchable retarder 100. One or more controllers 204 are electrically coupled with voltage modulator 106. In some embodiments, one or more controllers 204 are configured to operate (e.g., provide signals) to voltage modulator 106 for adjusting the voltage applied across switchable retarder 100. In FIG. 2A, one or more components (e.g., one or more electrodes and/or one or more alignment layers) are not shown so as not to obscure other aspects of switchable retardation device 200.

FIG. 2B is a block diagram illustrating method 250 of operating switchable retardation device 200 in accordance with some embodiments. Method 250 includes providing (step 252), by driver circuit 202, a first voltage (e.g., $V_1$) for placing switchable retarder 100 in a first state (e.g., switchable retarder 100-1 in the first state as shown in FIG. 1A). In some embodiments, the first voltage has a value greater than 15 V (e.g., greater than 15 V or less than −15 V), greater than 16 V (e.g., greater than 16 V or less than −16 V), greater than 17 V (e.g., greater than 17 V or less than −17 V), greater than 18 V, greater than 19 V, greater than 20 V, greater than 25 V, or greater than 30 V. The first voltage is applied across at least a portion of switchable retarder 100 (e.g., the first voltage is applied between the electrodes 105-1 and 105-2).

In some embodiments, the first voltage is applied at a predefined frequency (e.g., driver circuit 202 provides the first voltage and another voltage that is different from the first voltage alternatingly at the predefined frequency). In some embodiments, the predefined frequency ranges from 10 to 900 Hz, from 10 to 800 Hz, from 10 to 700 Hz, from 10 to 600 Hz, from 10 to 500 Hz, from 10 to 400 Hz, from 10 to 300 Hz, from 10 to 200 Hz, from 10 to 100 Hz, from 20 to 100 Hz from 30 to 100 Hz from 40 to 100 Hz, from 50 to 100 Hz, from 50 to 200 Hz, from 50 to 300 Hz, from 50 to 400 Hz, or from 50 to 500 Hz. In some embodiments, the predefined frequency is 100 Hz. In some embodiments, the predefined frequency is 60 Hz.

Method 250 includes, in response to, in conjunction with, or by, applying the first voltage across at least a portion of switchable retarder 100, switching (step 254) switchable retarder 100 to the first state (e.g., placing switchable retarder 100 in the first state). This allows liquid crystals 102 of switchable retarder 100 to align substantially linearly along an electric field generated by the first voltage, as shown in FIG. 1A.

Method 250 also includes transmitting (step 256) light through switchable retarder 100 while switchable retarder 100 is in the first state. This allows the transmitted light to maintain its polarization. For example, switchable retarder 100-1 transmits light having a first circular polarization without converting the polarization of the light.

Method 250 further includes providing (step 258), by driver circuit 202, a second voltage (e.g., $V_2$) for placing switchable retarder 100 in a second state. The second voltage is applied across at least a portion of switchable retarder 100. The second voltage has an absolute value greater than zero (e.g., the second voltage is a non-zero voltage) and the first voltage is greater than the second voltage (e.g., the absolute value of the first voltage is greater than the absolute value of the second voltage). In some embodiments, the second voltage ranges from 1 V to 15 V, from 3 V to 10 V, from 4 V to 9 V, from 5 V to 8 V, or from 6 V to 7 V. In some embodiments, the second voltage has a value substantially corresponding to 5 V (e.g., the second voltage is substantially +5 V or −5 V). In some embodiments, the second voltage has a value substantially corresponding to 6 V (e.g., the second voltage is substantially +6 V or −6 V). In some embodiments, the second voltage has a value substantially corresponding to 7 V (e.g., the second voltage is substantially +7 V or −7 V).

Method 250 includes, in response to, in conjunction with, or by, applying the second voltage across at least a portion of switchable retarder 100, switching (step 260) switchable retarder 100 to the second state (e.g., placing switchable retarder 100 in the second state) so that liquid crystals 102 of switchable retarder 100 align parallel to substrates (e.g., substrates 104-1 and 104-2) of switchable retarder 100, as shown in FIG. 1B.

Method 250 also includes transmitting (step 262) light through switchable retarder 100 while switchable retarder 100 is in the second state. This allows converting the polarization of the light from the first circular polarization to a second circular polarization orthogonal to the first circular polarization. In some embodiments, the first polarization is right-handed circular polarization and the second polarization is left-handed circular polarization, or vice versa.

In some embodiments, the second voltage is applied with the same predefined frequency as the first voltage.

In some embodiments, the driver circuit 202 alternates between the first voltage and the second voltage with a duty cycle corresponding to 5%, 10%, 20%, 25%, 30%, 35%, 40%, 45%, 50%, 55%, 60%, 65%, 70%, 75%, 80%, 90%, or 95%, or an interval between any two of the aforementioned values.

In some embodiments, the second voltage is applied with a frequency different from the predefined frequency for the first voltage (e.g., the second voltage may be applied at a frequency that is a multiple of the predefined frequency, or the predefined frequency for the first voltage is a multiple of the frequency at which the second voltage is applied). In some embodiments, the second voltage is applied at a frequency from 10 to 900 Hz, from 10 to 800 Hz, from 10 to 700 Hz, from 10 to 600 Hz, from 10 to 500 Hz, from 10 to 400 Hz, from 10 to 300 Hz, from 10 to 200 Hz, from 10 to 100 Hz, from 20 to 100 Hz from 30 to 100 Hz from 40 to 100 Hz, from 50 to 100 Hz, from 50 to 200 Hz, from 50 to 300 Hz, from 50 to 400 Hz, or from 50 to 500 Hz).

As described with respect to FIGS. 1A-2B, switchable retardation device 200 is therefore configured to reduce or eliminate the retardation deviation of conventional switchable retardation elements. In some embodiments, while in the second state, the retardation deviation of light transmitted through switchable retarder 100 is substantially zero across the visible wavelength range. For example, the retardation deviation of light transmitted through switchable retarder 100 is less than 5 degrees, less than 10 degrees, or less than 15 degrees across the visible wavelength range.

Figure 3A:
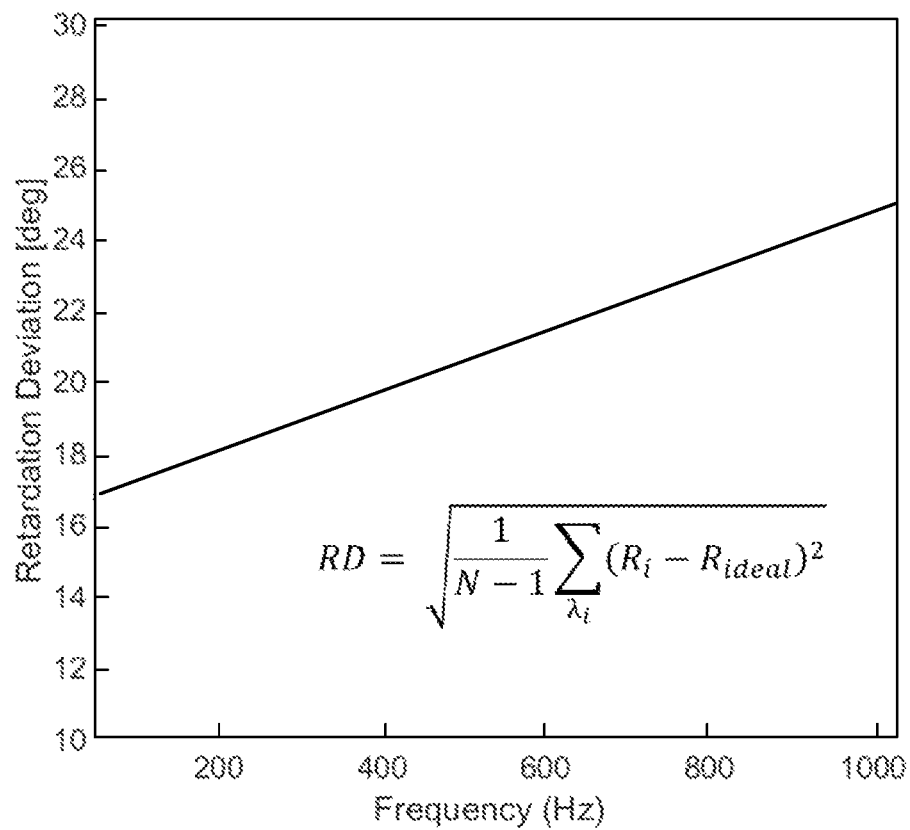
FIG. 3A is a schematic diagram illustrating an experimentally derived dependency between a retardation deviation and a frequency of an applied voltage in a switchable retarder device in accordance with some embodiments.

FIG. 3A is a schematic diagram illustrating an experimentally derived dependency between a retardation deviation and a frequency of an applied voltage in a switchable retarder device in accordance with some embodiments. FIG. 3A shows that the retardation deviation (RD) of switchable retarder 100-1 in the first state (e.g., high voltage, on-state) is a function of the frequency of the applied voltage (or current). The retardation deviation (RD) may be expressed as the following formula:

$$RD = \sqrt{\frac{1}{N-1} \sum_{\lambda_i} (R_i - R_{ideal})^2},$$

where $R_{ideal}$ corresponds to a desired (ideal) retardation (e.g., zero degrees or 180 degrees, depending on the state of switchable retarder 100), $R_i$ corresponds to retardation at each spectral point $\lambda_i$, and N corresponds to a number of measurement points acquired. As shown in FIG. 3A, the retardation deviation (RD) for the frequency of 60 Hz ranges between 16 and 18 degrees and the retardation deviation at the frequency of 1000 Hz ranges from about 24 to 26 degrees. The function of the retardation deviation shown in FIG. 3A may be used to choose a frequency for operating switchable retarder 100. In some embodiments, the predefined frequency has a value ranging from 10 to 1000 Hz. In some embodiments, the predefined frequency has a value ranging from 10 to 900 Hz, from 10 to 800 Hz, from 10 to 700 Hz, from 10 to 600 Hz, from 10 to 500 Hz, from 10 to 400 Hz, from 10 to 300 Hz, from 10 to 200 Hz, from 10 to 100 Hz, from 20 to 100 Hz from 30 to 100 Hz from 40 to 100 Hz, from 50 to 100 Hz, from 50 to 200 Hz, from 50 to 300 Hz, from 50 to 400 Hz, or from 50 to 500 Hz. For example, for achieving a low retardation deviation for switchable retarder 100, driver circuit 202 provides a voltage (or current) at a low frequency (e.g., less than 200 Hz, or less than 100 Hz, such as 60 Hz). However, in some applications, a different predefined frequency may be selected. For example, when switchable retarder 100 is combined in a display device operating at a frequency of 90 Hz, a predefined frequency for operating switchable retarder 100 may be 90 Hz or higher (e.g., 100 Hz).

Figure 3B:
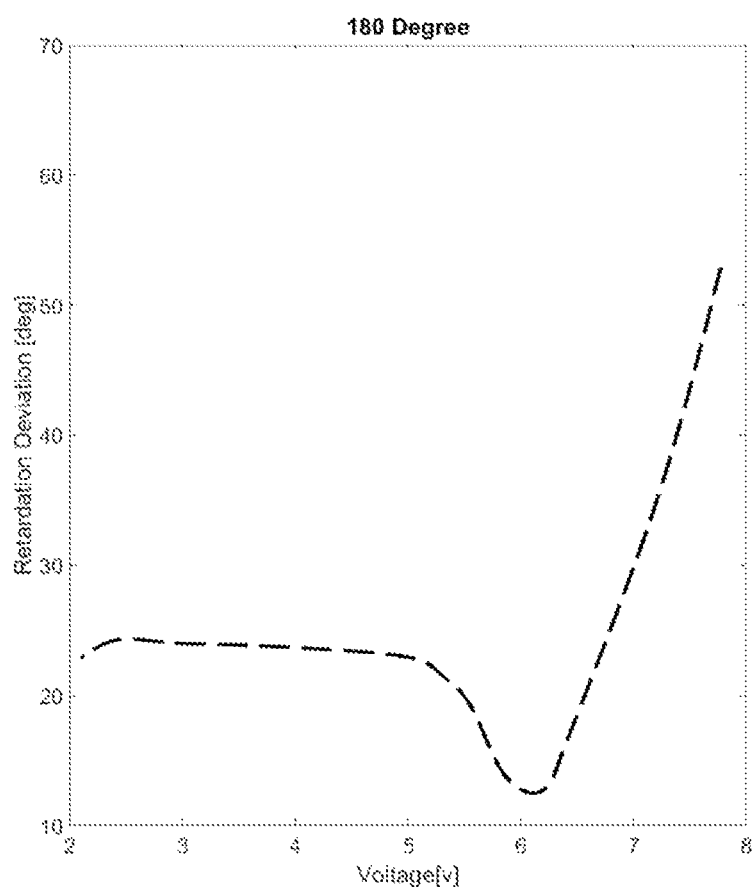
FIG. 3B is a schematic diagram illustrating an experimentally derived dependency between a retardation deviation and an applied voltage in a switchable retarder device in accordance with some embodiments.

FIG. 3B is a schematic diagram illustrating an experimentally derived dependency between a retardation deviation and an applied voltage in a switchable retarder device in accordance with some embodiments. FIG. 3B shows that retardation deviation (e.g., degree) of switchable retarder 100-2 in the second state is a function of the applied second voltage (or current) (e.g., the voltage that places switchable retarder 100-2 in the second state). As shown in FIG. 3B, when no or low voltage (e.g., voltage less than 5 V) is applied, switchable retarder 100-2 still has certain retardation. For example, in FIG. 3B, a retardation deviation ranging between 20 and 25 degrees is observed when 2 V is applied across a switchable retarder. However, applying certain voltage may reduce the retardation deviation while switchable retarder 100-2 is in the second state. As shown in FIG. 3B, applying a voltage ranging from 5 V to 7 V reduces the retardation deviation down to a value ranging from about 10 to about 15 degrees. Therefore, in some embodiments, the second voltage ($V_2$) for placing switchable retarder 100-2 in the second state is selected from a range between 1 V and 15 V, between 3 V and 9 V, between 4 V and 8 V, between 5 V and 7 V, or between 5.5 V and 6.5 V. In some embodiments, the second voltage corresponds to substantially 5 V, 6 V, or 7 V.

Figure 4A:
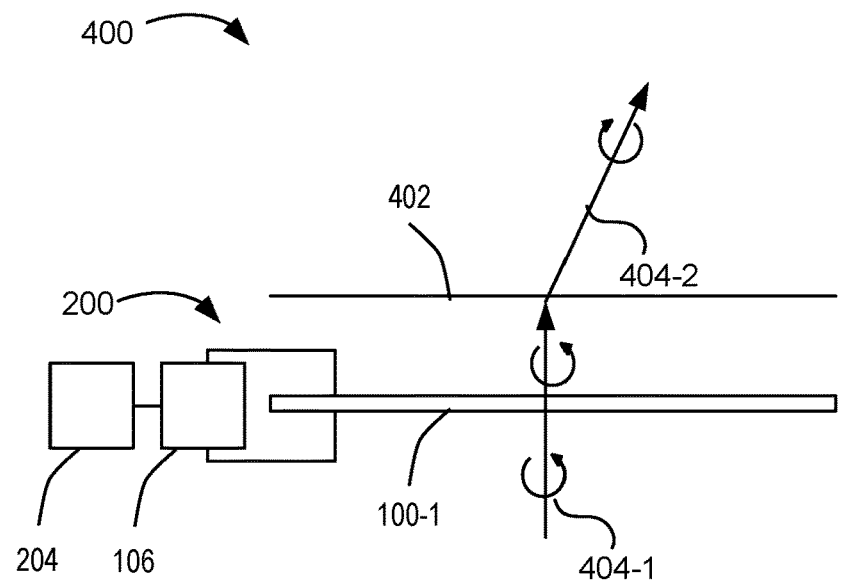
FIGS. 4A and 4B are schematic diagrams illustrating an optical assembly in accordance with some embodiments.
Figure 4B:
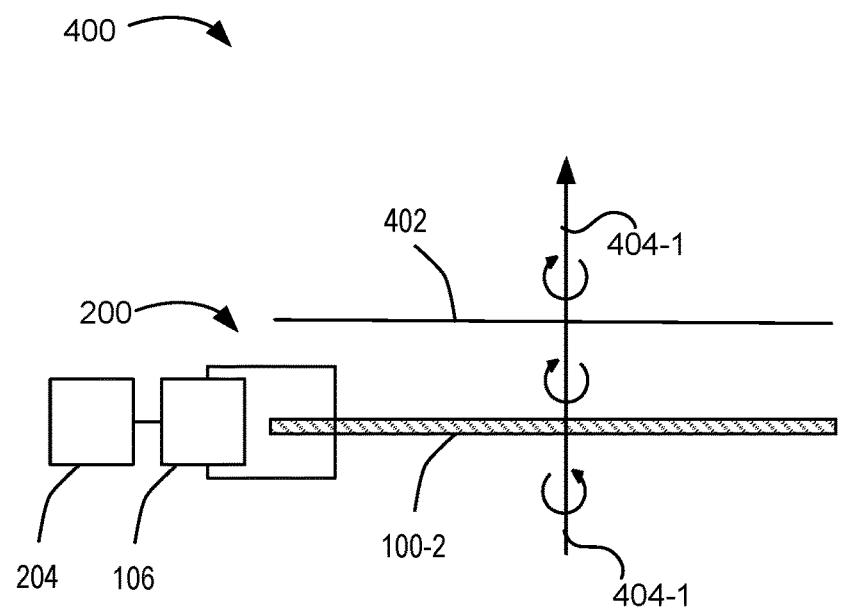

FIGS. 4A and 4B are schematic diagrams illustrating optical assembly 400 in accordance with some embodiments. Optical assembly 400 includes switchable retardation device 200 and polarization-selective element 402 optically coupled with switchable retarder 100 of switchable retardation device 200. In some embodiments, polarization-selective element 402 is a polarization volume hologram (PVH) optical element. For example, polarization-selective element 402 is a PVH lens or a PVH grating (e.g., PVH grating 500 described in detail with respect to FIGS. 5A-5D). A PVH optical element is selective with respect to polarization handedness, incident angle, and/or wavelength range of light incident thereon. For example, a PVH grating may transmit light having a first circular polarization while maintaining its direction and polarization (regardless of its incident angle or wavelength) and redirect (e.g., diffract) light having a second circular polarization (e.g., orthogonal to the first circular polarization) and being within a particular range of incident angles and within a particular range of wavelengths while converting the polarization of the redirected light to the first circular polarization (e.g., the first circular polarization corresponds to right-handed circular polarization and the second circular polarization corresponds to left-handed circular polarization, or vice versa). In some embodiments, the PVH grating does not transmit a substantial portion (e.g., more than 80%, 90%, 95%, or 99%) of light having the second circular polarization that is within the particular range of incident angles and within the particular range of wavelengths. In some embodiments, the PVH grating may transmit light having an incident angle outside the particular range of incident angles (regardless of its polarization or wavelength) without redirecting the light. In some embodiments, the PVH grating may transmit light having a wavelength outside the particular wavelength range (regardless of its polarization or incident angle) without redirecting the light.

In some embodiments, polarization-selective optical element 402 is a cholesteric liquid crystal (CLC) grating. Similar to a PVH, a CLC optical element is selective with respect to circular polarization, incident angle, and/or wavelength range of light incident thereon. For example, a CLC grating may transmit light having a first circular polarization while maintaining its direction and polarization and redirect (e.g., diffract) light having a second circular polarization that is orthogonal to the first circular polarization while converting the polarization of the redirected light to the first circular polarization.

In FIG. 4A, switchable retarder 100-1 is in the first state. As shown, switchable retarder 100-1 transmits light 404-1 having a first circular polarization while substantially maintaining the polarization (and in some cases, direction) of light 404-1 (e.g., rotating the polarization of the transmitted light by 15 degrees or less, such as 13 degrees, 12 degrees, 11 degrees, 10 degrees, 5 degrees, 4 degrees, 3 degrees, 2 degrees, 1 degree, or 0 degrees). Polarization-selective optical element 402 is configured to receive light 404-1 having the first circular polarization transmitted through switchable retarder 100-1 in a first direction. Polarization-selective optical element 402 is further configured to redirect light 404-1 as light 404-2 in a second direction distinct from the first direction. In some configurations, polarization-selective optical element 402 also converts the polarization of the light from the first circular polarization to a second circular polarization. In some configurations, the second circular polarization is substantially orthogonal to the first circular polarization (e.g., the second circular polarization is obtained by causing phase retardation of between 150 and 210 degrees, such as between 160 and 200 degrees, between 170 and 190 degrees, etc.). For example, the first circular polarization may correspond to right-handed circular polarization and the second circular polarization may correspond to left-handed circular polarization, or vice versa.

In FIG. 4B, switchable retarder 100-2 is in the second state. As shown, switchable retarder 100-2 transmits light 404-1 having the first circular polarization while substantially converting the polarization from the first circular polarization to the second circular polarization. Polarization-selective optical element 402 is configured to receive light 404-1 having the second circular polarization transmitted through switchable retarder 100-2 in the first direction. Polarization-selective optical element 402 is further configured to transmit light 404-1 while substantially maintaining the polarization (and in some cases, direction) of the light.

In some embodiments, the polarization-selective optical element is configured to redirect light having the second circular polarization while converting its polarization from the circular second polarization to the first circular polarization and transmit light having the first circular polarization while maintaining the polarization (e.g., the polarization-selective optical element has an handedness orthogonal to that of polarization-selective optical element 402 shown in FIGS. 4A and 4B). In such case, while switchable retarder 100-1 is in the first state, optical assembly 400 is configured to project light 404-1 having the first circular polarization in the first direction as light having the first circular polarization, and, while switchable retarder 100-2 in in the second state, optical assembly 400 is configured to redirect light 404-2 having the second circular polarization.

Figure 4C:
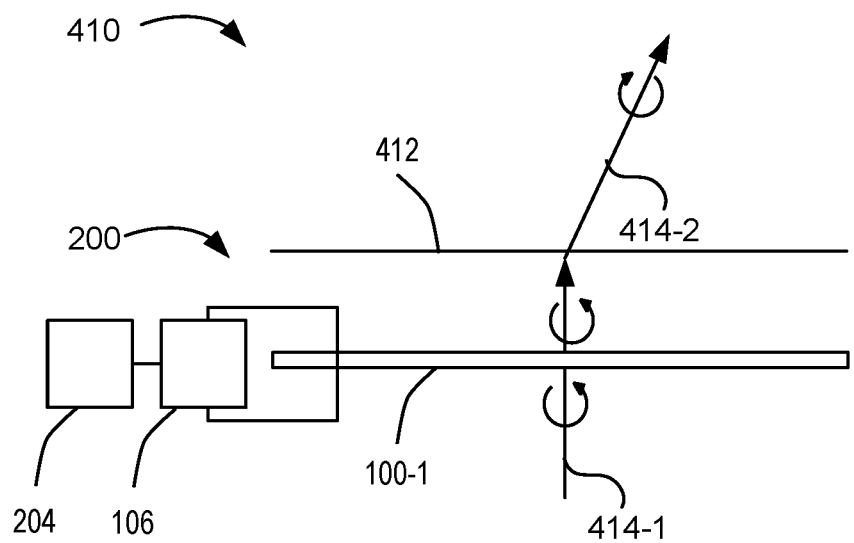
FIGS. 4C and 4D are schematic diagrams illustrating an optical assembly in accordance with some embodiments.
Figure 4D:
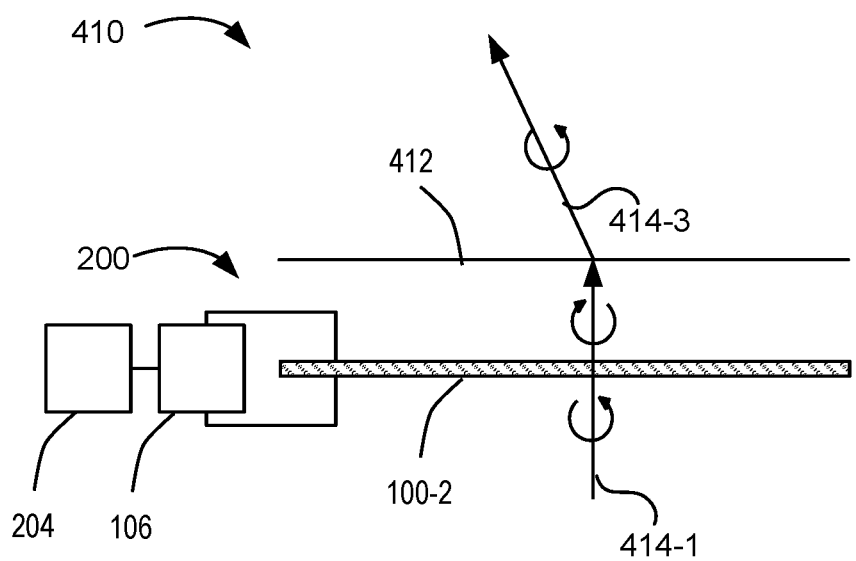

FIGS. 4C and 4D are schematic diagrams illustrating optical assembly 410 in accordance with some embodiments. Optical assembly 410 includes switchable retardation device 200 and polarization-selective element 412 optically coupled with switchable retarder 100 of switchable retardation device 200. In some embodiments, polarization-selective optical element 412 is a Pancharatnam-Berry phase (PBP) optical element (also known as a geometric phase optical element). For example, polarization-selective optical element 412 is a PBP lens or a PBP grating (e.g., PBP grating 600 described in detail with respect to FIGS. 6A-6D). A PBP optical element is selective with respect to polarization handedness and/or wavelength range of light incident thereon. For example, a PBP grating may diffract light having a first circular polarization in a first direction (e.g., in a direction corresponding to a first positive order of diffraction) and diffract light having a second circular polarization that is orthogonal to the first circular polarization in a second direction that is different from the first direction (e.g., in a direction corresponding to first negative order of diffraction). In addition, the PBP grating converts the polarization of the diffracted light such that light having the first circular polarization is diffracted as light having the second circular polarization, and light having the second circular polarization is diffracted as light having the first circular polarization. In some embodiments, polarization-selective optical element 412 is an optical element including a metasurface, a resonant structured surface, a polarization-selective element including a continuous chiral layer, or a polarization-selective element including a birefringent material.

In FIG. 4C, switchable retarder 100-1 is in the first state. As shown, switchable retarder 100-1 transmits light 414-1 having the first circular polarization while substantially maintaining the polarization of light 414-1 (e.g., rotating the polarization of the transmitted light by 15 degrees or less, such as 13 degrees, 12 degrees, 11 degrees, 10 degrees, 5 degrees, 4 degrees, 3 degrees, 2 degrees, 1 degree, or 0 degrees). Polarization-selective optical element 412 is configured to receive light 414-1 having the first circular polarization transmitted through switchable retarder 100-1 in a third direction. Polarization-selective optical element 412 is further configured to redirect light 414-1 as light 414-2 in a fourth direction distinct from the third direction while substantially converting the polarization of the light from the first circular polarization to the second circular polarization.

In FIG. 4D, switchable retarder 100-2 is in the second state. As shown, switchable retarder 100-2 transmits light 414-1 having the first circular polarization while converting the polarization from the first circular polarization to the second circular polarization. Polarization-selective optical element 412 is configured to receive light 414-1 having the second circular polarization transmitted through switchable retarder 100-2 in the third direction. Polarization-selective optical element 412 is further configured to redirect light 414-1 as light 414-3 in a fifth direction distinct from the third direction and the fourth direction while substantially converting the polarization of the light from the second circular polarization to the first circular polarization.

In some embodiments, two or more optical assemblies 400 and/or 410 are combined (e.g., stacked) together. For example, two or more optical assemblies 400 and/or 410 having selectivity toward distinct wavelength ranges could be combined together to project light based on the polarization and wavelength of an incident light. Optical combiners including such combinations of optical assemblies are described in U.S. patent application Ser. No. 16/733,092, entitled "Optical Combiner Including Polarization-Selective Elements and Switchable Half-Wave Plates for Pupil Steering" filed Jan. 2, 2020, which is herein incorporated by reference in its entirety.

Figure 5C:
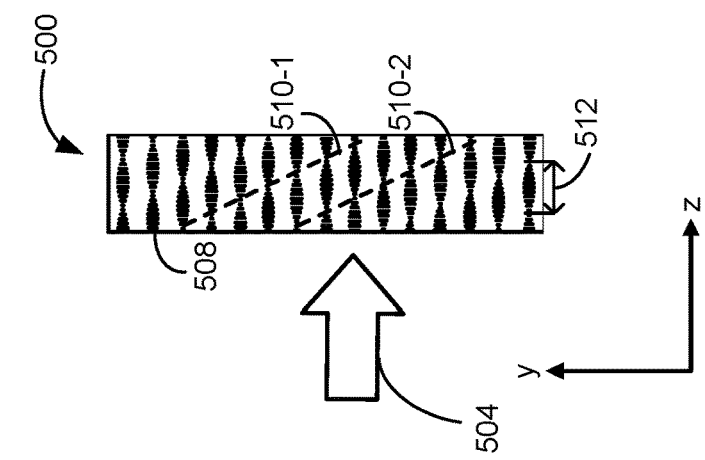
FIGS. 5A-5D are schematic diagrams illustrating a polarization volume holographic grating in accordance with some embodiments.
Figure 5B:
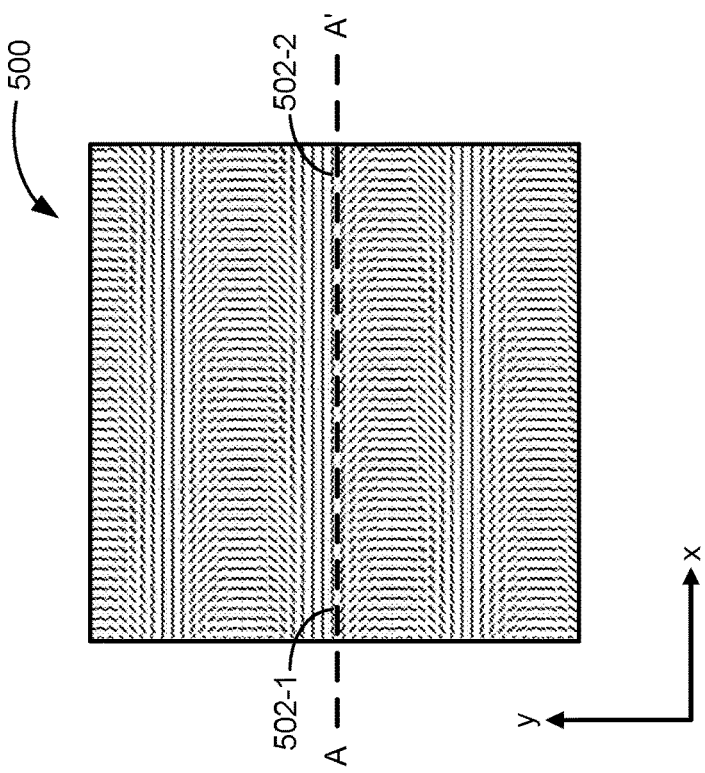
Figure 5A:
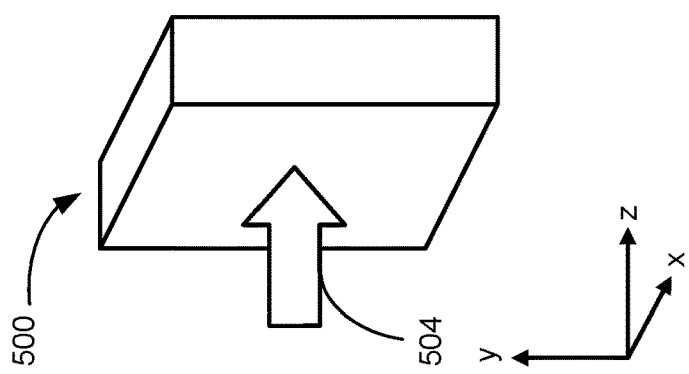
Figure 5D:
Figure 5D:
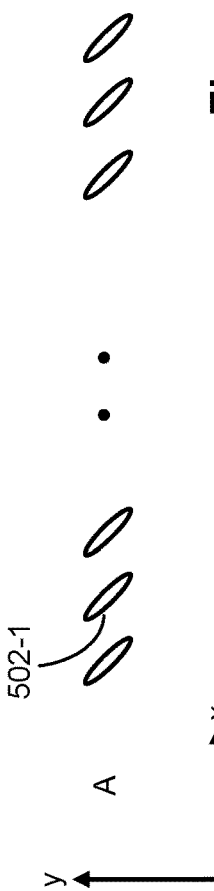

FIGS. 5A-5D are schematic diagrams illustrating polarization volume hologram (PVH) grating 500 in accordance with some embodiments. In some embodiments, PVH grating 500 corresponds to polarization-selective optical element 402 described with respect to FIGS. 4A and 4B. FIG. 5A illustrates a three dimensional view of PVH grating 500 with incoming light 504 entering the lens along the z-axis. FIG. 5B illustrates an x-y-plane view of PVH grating 500 with a plurality of cholesteric liquid crystals (e.g., liquid crystals 502-1 and 502-2) with various orientations. The orientations (e.g., represented by azimuthal angles θ) of the liquid crystals are constant along reference line AA' along the x-axis, as shown in FIG. 5D illustrating a detailed plane view of the liquid crystals along the reference line. The orientations of the liquid crystals in FIG. 5B vary along the y-axis. The pitch defined as a distance along the y-axis at which the azimuth angle of a liquid crystal has rotated 180 degrees may be constant throughout the grating. FIG. 5C illustrates a y-z-cross-sectional view of PVH grating 500. In FIG. 5C, PVH grating 500 has helical structures 508 with helical axes aligned corresponding to the x-axis. The helical structures create a volume grating with a plurality of diffraction planes (e.g., planes 510-1 and 510-2) extending across the grating. In FIG. 5C, diffraction planes 510-1 and 510-2 are tilted with respect to the z-axis. Helical structures 508 define the polarization selectivity of PVH grating 500, as light with circular polarization handedness corresponding to the helical axes is diffracted while light with circular polarization with the opposite handedness is not diffracted. Helical structures 508 also define the wavelength selectivity of PVH grating 500, as light with wavelength close to a helical pitch (e.g., helical pitch 512 in FIG. 5C) is diffracted while light with other wavelengths is not diffracted.

In some embodiments, polarization-selective optical element 402 described with respect to FIGS. 4A and 4B are cholesteric liquid crystal (CLC) gratings. A CLC grating has similar optical properties to those described with respect to PVH grating 500. A CLC and PVH both include cholesteric liquid crystals in helical arrangements. CLC grating further includes a photoalignment layer and the CLCs are arranged to helical structures in accordance with the photoalignment layer. In contrast, in a PVH grating CLCs are arranged to helical structures in accordance with holographic recording.

Figure 6C:
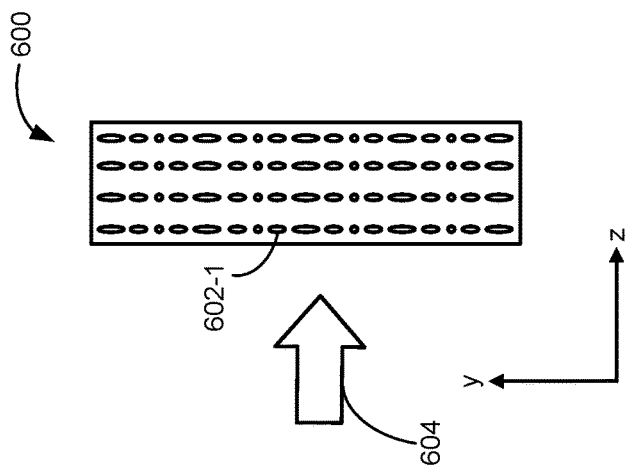
FIGS. 6A-6D are schematic diagrams illustrating a Pancharatnam-Berry phase (PBP) grating in accordance with some embodiments.
Figure 6B:
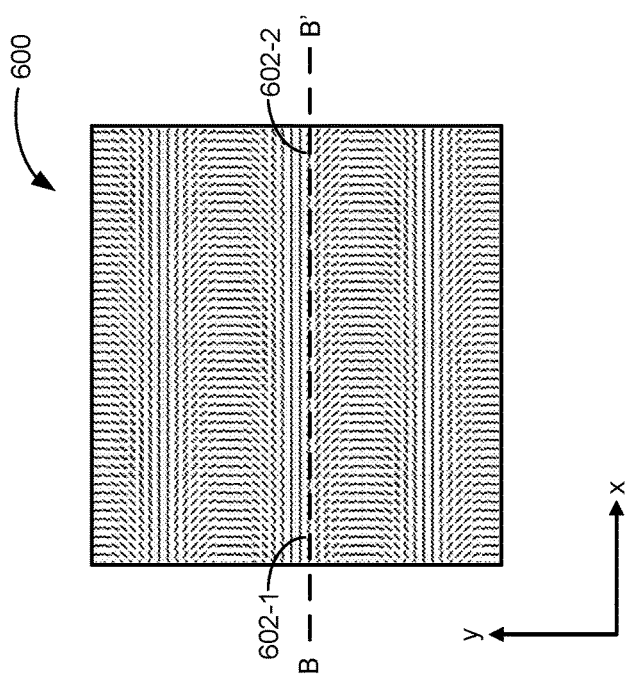
Figure 6A:
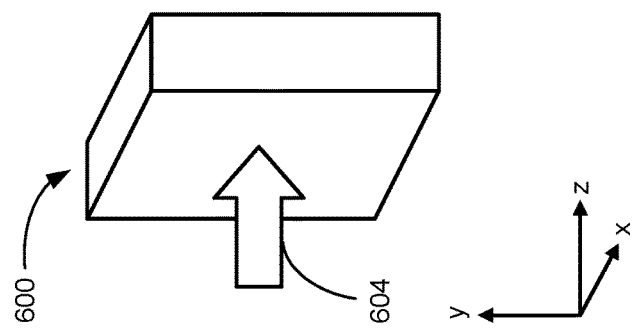
Figure 6D:

FIGS. 6A-6D are schematic diagrams illustrating Pancharatnam-Berry phase (PBP) grating 600 in accordance with some embodiments. In some embodiments, PBP grating 600 corresponds to polarization-selective optical element 412 described with respect to FIGS. 4C and 4D. FIG. 6A illustrates a three dimensional view of PBP grating 600 with incoming light 604 entering the lens along the z-axis. FIG. 6B illustrates an x-y-plane view of PBP grating 600 showing a plurality of liquid crystals (e.g., liquid crystals 602-1 and 602-2) with various orientations in the PBP grating 600. The orientations (i.e., azimuthal angles θ) of the liquid crystals are constant along reference line between B and B' along the x-axis, as shown in FIG. 6D illustrating a detailed plane view of the liquid crystals along the reference line. The orientations of the liquid crystals in FIG. 6B vary along the y-axis while the pitch defined as a distance along the y-axis at which the azimuth angle of a liquid crystal has rotated 180 degrees may be constant throughout the grating. FIG. 6C illustrates a y-z-cross-sectional view of PBP grating 600. As shown in FIG. 6C, the orientations of the liquid crystal (e.g., liquid crystal 602-1) remain constant along the z-direction.

In some embodiments, switchable retarder devices 200 and/or optical assemblies 400 and 410 may be used in display devices such as head-mounted display devices. In some embodiments, switchable retarder devices 200 and/or optical assemblies 400 and 410 may be implemented as multifunctional optical components in near-eye displays for augmented reality ("AR"), virtual reality ("VR"), and/or mixed reality ("MR"). For example, the disclosed optical elements or devices may be implemented in waveguide-based combiners, eye-tracking components, display resolution enhancement components, pupil steering elements, and polarization controlling components (e.g., a quarter-wave plate or a half-wave plate), etc., which may significantly reduce the weight and size, and enhance the optical performance of the head-mounted display devices. Exemplary embodiments of head-mounted display devices for implementing switchable retarder devices 200 and/or optical assemblies 400 and 410 are described with respect to FIGS. 7-9.

Figure 7:
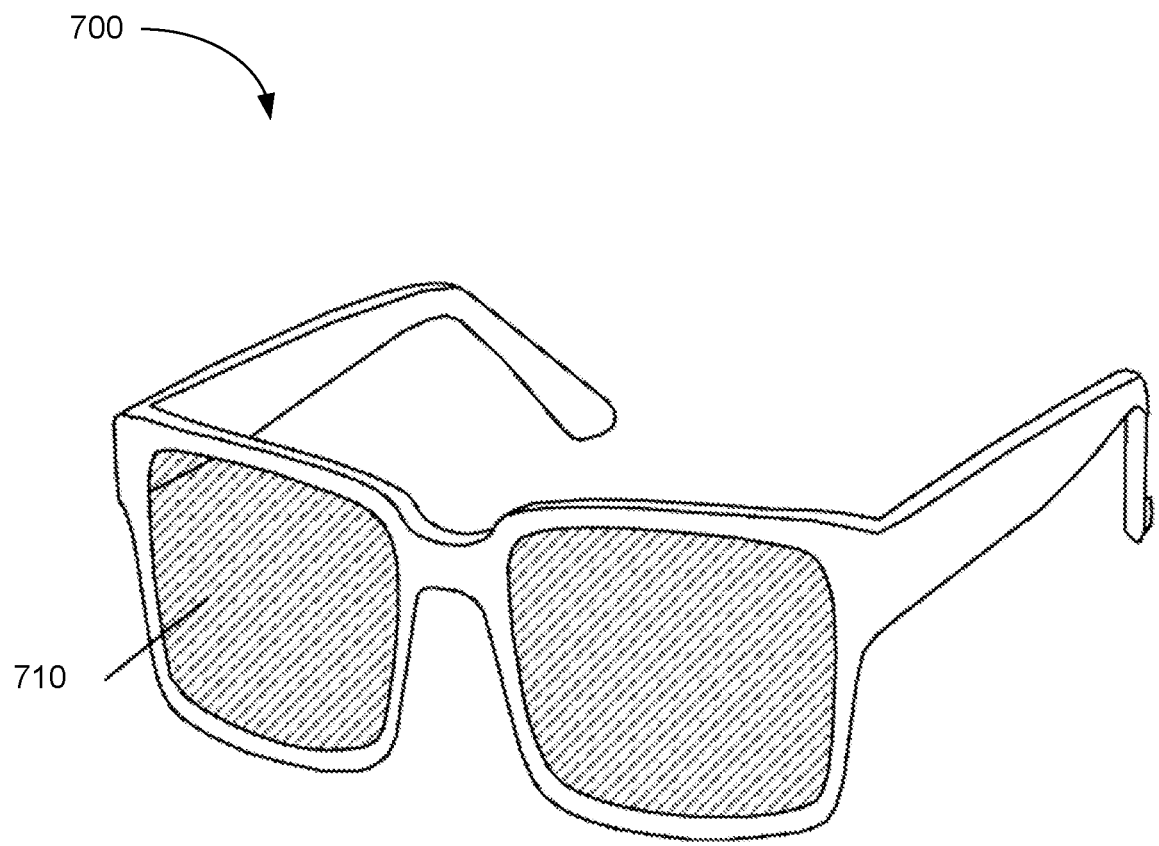
FIG. 7 is a perspective view of a display device in accordance with some embodiments.

FIG. 7 illustrates display device 700 in accordance with some embodiments. In some embodiments, display device 700 is configured to be worn on a head of a user (e.g., by having the form of spectacles or eyeglasses, as shown in FIG. 7) or to be included as part of a helmet that is to be worn by the user. When display device 700 is configured to be worn on a head of a user or to be included as part of a helmet, display device 700 is called a head-mounted display. Alternatively, display device 700 is configured for placement in proximity of an eye or eyes of the user at a fixed location, without being head-mounted (e.g., display device 700 is mounted in a vehicle, such as a car or an airplane, for placement in front of an eye or eyes of the user). As shown in FIG. 7, display device 700 includes display 710. Display 710 is configured for presenting visual contents (e.g., augmented reality contents, virtual reality contents, mixed reality contents, or any combination thereof) to a user.

Figure 8:
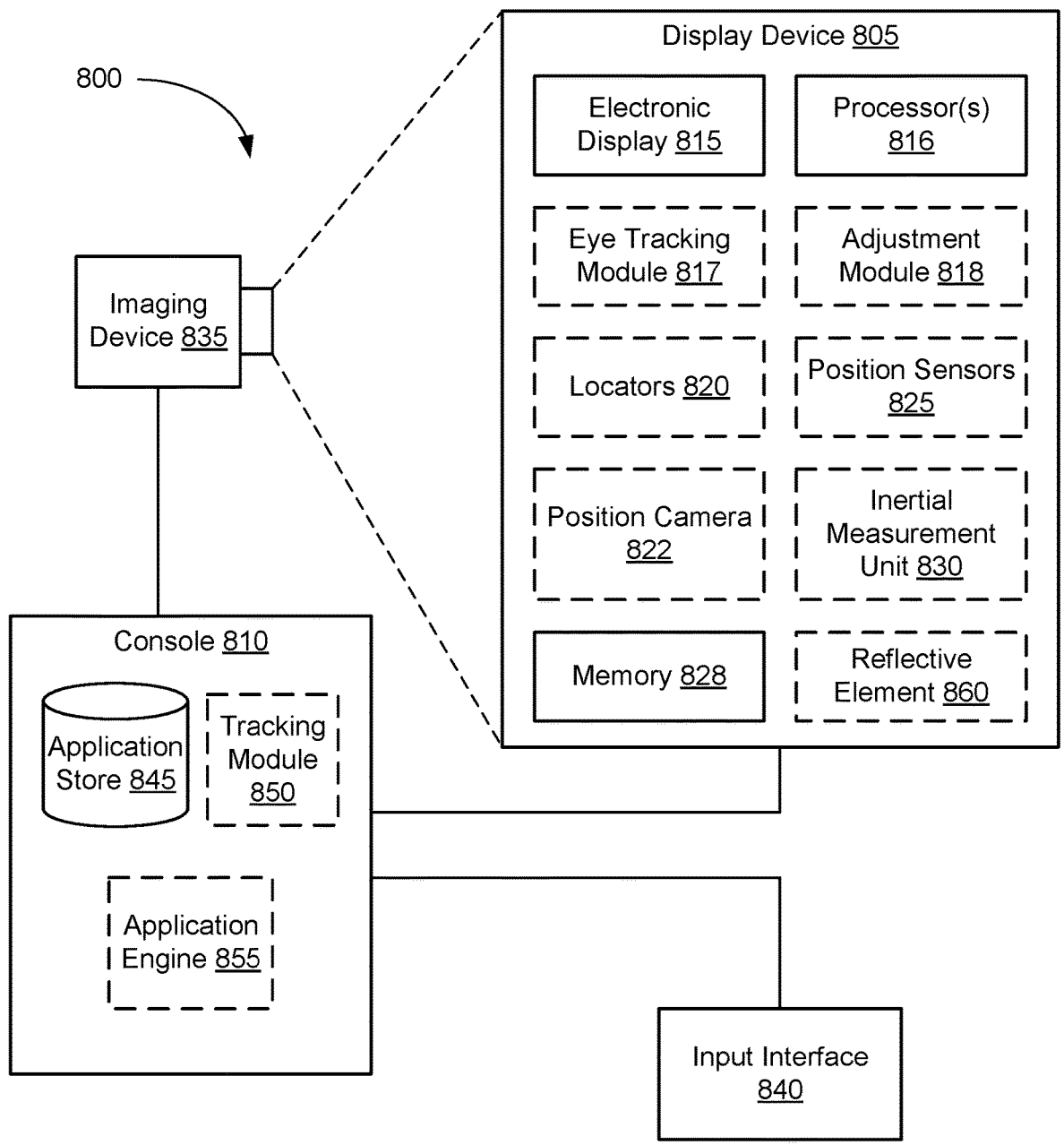
FIG. 8 is a block diagram of a system including a display device in accordance with some embodiments.

In some embodiments, display device 700 includes one or more components described herein with respect to FIG. 8. In some embodiments, display device 700 includes additional components not shown in FIG. 8.

FIG. 8 is a block diagram of system 800 in accordance with some embodiments. The system 800 shown in FIG. 8 includes display device 805 (which corresponds to display device 700 shown in FIG. 7), imaging device 835, and input interface 840 that are each coupled to console 810. While FIG. 8 shows an example of system 800 including one display device 805, imaging device 835, and input interface 840, in other embodiments, any number of these components may be included in system 800. For example, there may be multiple display devices 805 each having associated input interface 840 and being monitored by one or more imaging devices 835, with each display device 805, input interface 840, and imaging devices 835 communicating with console 810. In alternative configurations, different and/or additional components may be included in system 800. For example, in some embodiments, console 810 is connected via a network (e.g., the Internet or a wireless network) to system 800 or is self-contained as part of display device 805 (e.g., physically located inside display device 805). In some embodiments, display device 805 is used to create mixed reality by adding in a view of the real surroundings. Thus, display device 805 and system 800 described here can deliver augmented reality, virtual reality, and mixed reality.

In some embodiments, as shown in FIG. 7, display device 805 is a head-mounted display that presents media to a user. Examples of media presented by display device 805 include one or more images, video, audio, or some combination thereof. In some embodiments, audio is presented via an external device (e.g., speakers and/or headphones) that receives audio information from display device 805, console 810, or both, and presents audio data based on the audio information. In some embodiments, display device 805 immerses a user in an augmented environment.

In some embodiments, display device 805 also acts as an augmented reality (AR) headset. In these embodiments, display device 805 augments views of a physical, real-world environment with computer-generated elements (e.g., images, video, sound, etc.). Moreover, in some embodiments, display device 805 is able to cycle between different types of operation. Thus, display device 805 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 855.

Display device 805 includes electronic display 815, one or more processors 816, eye tracking module 817, adjustment module 818, one or more locators 820, one or more position sensors 825, one or more position cameras 822, memory 828, inertial measurement unit (IMU) 830, one or more optical elements 860 or a subset or superset thereof (e.g., display device 805 with electronic display 815, one or more processors 816, and memory 828, without any other listed components). Some embodiments of display device 805 have different modules than those described here. Similarly, the functions can be distributed among the modules in a different manner than is described here.

One or more processors 816 (e.g., processing units or cores) execute instructions stored in memory 828. Memory 828 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 828, or alternately the non-volatile memory device(s) within memory 828, includes a non-transitory computer readable storage medium. In some embodiments, memory 828 or the computer readable storage medium of memory 828 stores programs, modules and data structures, and/or instructions for displaying one or more images on electronic display 815.

Electronic display 815 displays images to the user in accordance with data received from console 810 and/or processor(s) 816. In various embodiments, electronic display 815 may comprise a single adjustable display element or multiple adjustable display elements (e.g., a display for each eye of a user). In some embodiments, electronic display 815 is configured to display images to the user by projecting the images onto one or more optical elements 860.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 815 projects images to one or more reflective elements 860, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 805 (e.g., a user wearing display device 805) for viewing images from display device 805. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 817 determines locations of each pupil of a user's eyes. In some embodiments, eye tracking module 817 instructs electronic display 815 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 817 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 817 maps the locations of the user's pupil while looking at the reference points to corresponding signals received on the IR tracking array). As mentioned above, in some embodiments, system 800 may use other eye tracking systems than the embedded IR one described herein.

Adjustment module 818 generates an image frame based on the determined locations of the pupils. In some embodiments, this sends a discrete image to the display that will tile subimages together thus a coherent stitched image will appear on the back of the retina. Adjustment module 818 adjusts an output (i.e. the generated image frame) of electronic display 815 based on the detected locations of the pupils. Adjustment module 818 instructs portions of electronic display 815 to pass image light to the determined locations of the pupils. In some embodiments, adjustment module 818 also instructs the electronic display to not pass image light to positions other than the determined locations of the pupils. Adjustment module 818 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 820 are objects located in specific positions on display device 805 relative to one another and relative to a specific reference point on display device 805. A locator 820 may be a light emitting diode (LED), a corner cube reflector, a reflective marker, a type of light source that contrasts with an environment in which display device 805 operates, or some combination thereof. In embodiments where locators 820 are active (e.g., an LED or other type of light emitting device), locators 820 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 820 are located beneath an outer surface of display device 805, which is transparent to the wavelengths of light emitted or reflected by locators 820 or is thin enough to not substantially attenuate the wavelengths of light emitted or reflected by locators 820. Additionally, in some embodiments, the outer surface or other portions of display device 805 are opaque in the visible band of wavelengths of light. Thus, locators 820 may emit light in the IR band under an outer surface that is transparent in the IR band but opaque in the visible band.

IMU 830 is an electronic device that generates calibration data based on measurement signals received from one or more position sensors 825. Position sensor 825 generates one or more measurement signals in response to motion of display device 805. Examples of position sensors 825 include: one or more accelerometers, one or more gyroscopes, one or more magnetometers, another suitable type of sensor that detects motion, a type of sensor used for error correction of IMU 830, or some combination thereof. Position sensors 825 may be located external to IMU 830, internal to IMU 830, or some combination thereof.

Based on the one or more measurement signals from one or more position sensors 825, IMU 830 generates first calibration data indicating an estimated position of display device 805 relative to an initial position of display device 805. For example, position sensors 825 include multiple accelerometers to measure translational motion (forward/back, up/down, left/right) and multiple gyroscopes to measure rotational motion (e.g., pitch, yaw, roll). In some embodiments, IMU 830 rapidly samples the measurement signals and calculates the estimated position of display device 805 from the sampled data. For example, IMU 830 integrates the measurement signals received from the accelerometers over time to estimate a velocity vector and integrates the velocity vector over time to determine an estimated position of a reference point on display device 805. Alternatively, IMU 830 provides the sampled measurement signals to console 810, which determines the first calibration data. The reference point is a point that may be used to describe the position of display device 805. While the reference point may generally be defined as a point in space; however, in practice the reference point is defined as a point within display device 805 (e.g., a center of IMU 830).

In some embodiments, IMU 830 receives one or more calibration parameters from console 810. As further discussed below, the one or more calibration parameters are used to maintain tracking of display device 805. Based on a received calibration parameter, IMU 830 may adjust one or more IMU parameters (e.g., sample rate). In some embodiments, certain calibration parameters cause IMU 830 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 835 generates calibration data in accordance with calibration parameters received from console 810. Calibration data includes one or more images showing observed positions of locators 820 that are detectable by imaging device 835. In some embodiments, imaging device 835 includes one or more still cameras, one or more video cameras, any other device capable of capturing images including one or more locators 820, or some combination thereof. Additionally, imaging device 835 may include one or more filters (e.g., used to increase signal to noise ratio). Imaging device 835 is configured to optionally detect light emitted or reflected from locators 820 in a field of view of imaging device 835. In embodiments where locators 820 include passive elements (e.g., a retroreflector), imaging device 835 may include a light source that illuminates some or all of locators 820, which retro-reflect the light towards the light source in imaging device 835. Second calibration data is communicated from imaging device 835 to console 810, and imaging device 835 receives one or more calibration parameters from console 810 to adjust one or more imaging parameters (e.g., focal length, focus, frame rate, ISO, sensor temperature, shutter speed, aperture, etc.).

In some embodiments, display device 805 optionally includes one or more optical elements 860 (e.g., lenses, reflectors, gratings, etc.). In some embodiments, electronic display device 805 includes a single optical element 860 or multiple optical elements 860 (e.g., an optical element 860 for each eye of a user). In some embodiments, electronic display 815 projects computer-generated images on one or more optical elements 860, such as a reflective element, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more optical elements 860 are partially transparent (e.g., the one or more optical elements 860 have a transmittance of at least 15%, 20%, 25%, 30%, 35%, 50%, 55%, or 50%), which allows transmission of ambient light. In such embodiments, computer-generated images projected by electronic display 815 are superimposed with the transmitted ambient light (e.g., transmitted ambient image) to provide augmented reality images. In some embodiments, optical elements 860 include switchable retarder 100 and/or switchable retardation device 200 described above with respect to FIGS. 1A-2B.

Input interface 840 is a device that allows a user to send action requests to console 810. An action request is a request to perform a particular action. For example, an action request may be to start or end an application or to perform a particular action within the application. Input interface 840 may include one or more input devices. Example input devices include: a keyboard, a mouse, a game controller, data from brain signals, data from other parts of the human body, or any other suitable device for receiving action requests and communicating the received action requests to console 810. An action request received by input interface 840 is communicated to console 810, which performs an action corresponding to the action request. In some embodiments, input interface 840 may provide haptic feedback to the user in accordance with instructions received from console 810. For example, haptic feedback is provided when an action request is received, or console 810 communicates instructions to input interface 840 causing input interface 840 to generate haptic feedback when console 810 performs an action.

Console 810 provides media to display device 805 for presentation to the user in accordance with information received from one or more of: imaging device 835, display device 805, and input interface 840. In the example shown in FIG. 8, console 810 includes application store 845, tracking module 850, and application engine 855. Some embodiments of console 810 have different modules than those described in conjunction with FIG. 8. Similarly, the functions further described herein may be distributed among components of console 810 in a different manner than is described here.

When application store 845 is included in console 810, application store 845 stores one or more applications for execution by console 810. An application is a group of instructions, that when executed by a processor, is used for generating content for presentation to the user. Content generated by the processor based on an application may be in response to inputs received from the user via movement of display device 805 or input interface 840. Examples of applications include: gaming applications, conferencing applications, video playback application, or other suitable applications.

When tracking module 850 is included in console 810, tracking module 850 calibrates system 800 using one or more calibration parameters and may adjust one or more calibration parameters to reduce error in determination of the position of display device 805. For example, tracking module 850 adjusts the focus of imaging device 835 to obtain a more accurate position for observed locators on display device 805. Moreover, calibration performed by tracking module 850 also accounts for information received from IMU 830. Additionally, if tracking of display device 805 is lost (e.g., imaging device 835 loses line of sight of at least a threshold number of locators 820), tracking module 850 re-calibrates some or all of system 800.

In some embodiments, tracking module 850 tracks movements of display device 805 using second calibration data from imaging device 835. For example, tracking module 850 determines positions of a reference point of display device 805 using observed locators from the second calibration data and a model of display device 805. In some embodiments, tracking module 850 also determines positions of a reference point of display device 805 using position information from the first calibration data. Additionally, in some embodiments, tracking module 850 may use portions of the first calibration data, the second calibration data, or some combination thereof, to predict a future location of display device 805. Tracking module 850 provides the estimated or predicted future position of display device 805 to application engine 855.

Application engine 855 executes applications within system 800 and receives position information, acceleration information, velocity information, predicted future positions, or some combination thereof of display device 805 from tracking module 850. Based on the received information, application engine 855 determines content to provide to display device 805 for presentation to the user. For example, if the received information indicates that the user has looked to the left, application engine 855 generates content for display device 805 that mirrors the user's movement in an augmented environment. Additionally, application engine 855 performs an action within an application executing on console 810 in response to an action request received from input interface 840 and provides feedback to the user that the action was performed. The provided feedback may be visual or audible feedback via display device 805 or haptic feedback via input interface 840.

FIG. 9 is an isometric view of display device 900 in accordance with some embodiments. In some other embodiments, display device 900 is part of some other electronic display (e.g., a digital microscope, a head-mounted display device, etc.). In some embodiments, display device 900 includes light emission device 910 (e.g., a light emission device array) and an optical assembly 930, which may include one or more lenses and/or other optical components. In some embodiments, optical assembly 930 includes one or more optical assemblies 400 and/or 410 described above with respect to FIGS. 4A-4D. In some embodiments, display device 900 also includes an IR detector array.

Light emission device 910 emits image light and optional IR light toward the viewing user. Light emission device 910 includes one or more light emission components that emit light in the visible light (and optionally includes components that emit light in the IR). Light emission device 910 may include, e.g., an array of LEDs, an array of microLEDs, an array of organic LEDs (OLEDs), an array of superluminescent LEDs (sLEDS) or some combination thereof.

In some embodiments, light emission device 910 includes an emission intensity array (e.g., a spatial light modulator) configured to selectively attenuate light emitted from light emission device 910. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 930. In some embodiments, display device 900 uses the emission intensity array to facilitate providing image light to a location of pupil 950 of eye 940 of a user, and minimize the amount of image light provided to other areas in the eyebox.

The optical assembly 930 includes one or more lenses. The one or more lenses in optical assembly 930 receive modified image light (e.g., attenuated light) from light emission device 910, and direct the modified image light to a location of pupil 950. The optical assembly 930 may include additional optical components, such as color filters, mirrors, etc. In some embodiments, the optical assembly 930 includes switchable retardation device 200 and/or optical assembly 400 or 410 described above with respect to FIGS. 2A, 2B, and 4A-4D.

An optional IR detector array detects IR light that has been retro-reflected from the retina of eye 940, a cornea of eye 940, a crystalline lens of eye 940, or some combination thereof. The IR detector array includes either a single IR sensor or a plurality of IR sensitive detectors (e.g., photodiodes). In some embodiments, the IR detector array is separate from light emission device 910. In some embodiments, the IR detector array is integrated into light emission device 910.

In some embodiments, light emission device 910 including an emission intensity array make up a display element. Alternatively, the display element includes light emission device 910 (e.g., when light emission device 910 includes individually adjustable pixels) without the emission intensity array. In some embodiments, the display element additionally includes the IR array. In some embodiments, in response to a determined location of pupil 950, the display element adjusts the emitted image light such that the light output by the display element is refracted by one or more lenses toward the determined location of pupil 950, and not toward other locations in the eyebox.

In some embodiments, display device 900 includes one or more broadband sources (e.g., one or more white LEDs) coupled with a plurality of color filters, in addition to, or instead of, light emission device 910.

In light of these principles, we now turn to certain embodiments.

In accordance with some embodiments, a switchable optical retardation device includes a switchable retardation element and an electrical driver circuit (e.g., switchable retardation device 200 includes switchable retarder 100 and driver circuit 202 in FIG. 2A). The switchable retardation element includes liquid crystals (e.g., liquid crystals 102) and is switchable between different states including a first state and a second state (e.g., FIGS. 1A and 1B). While in the first state, the switchable retardation element modifies light transmitted through the switchable retardation element by causing a phase shift of a first retardation angle. While in the second state, the switchable retardation element modifies the light transmitted through the switchable retardation element by causing a phase shift of a second retardation angle distinct from the first retardation angle. For example, the switchable retardation element, while in the first state, causes a phase shift by the first retardation angle for a first portion of light (e.g., ordinary waves) relative to another portion of the light (e.g., extraordinary waves) and the switchable retardation element, while in the second state, causes a phase shift by the second retardation angle for the first portion of light relative to the another portion of light. The electrical driver circuit is electrically coupled with the switchable optical retardation element for providing a first voltage for placing the switchable retardation element in the first state and a second voltage for placing the switchable retardation element in the second state. The first voltage is greater than the second voltage, the second voltage is a non-zero voltage, and the electrical driver circuit alternatingly provides the first voltage and the second voltage with a predefined frequency.

In some embodiments, the first retardation angle is substantially zero degrees and the second retardation angle is substantially 180 degrees. In some embodiments, the switchable retardation element is a half-wave plate. For example, switchable retarder 100 operates as a half-wave plate in FIGS. 4A-4B. When in the first state, switchable retarder 100-1 transmits light 404-1 having a first circular polarization while maintaining the polarization of the light in FIG. 4A. When in the second state, switchable retarder 100-2 transmits light 404-1 having the first circular polarization while converting the polarization of the light from the first circular polarization to a second circular polarization orthogonal to the first circular polarization.

In some embodiments, while the switchable retardation element is in the first state, the liquid crystals of the switchable retardation element are arranged linearly along an electric field generated by the first voltage (e.g., liquid crystals 102 are arranged linearly along an electric field generated by voltage $V_1$ applied across switchable retarder 100-1 in the first state in FIG. 1A). In some embodiments, the liquid crystals of the switchable retardation element are arranged substantially linearly along an electric field generated by the first voltage. While the switchable retardation element is in the second state, the liquid crystals of the switchable retardation element are arranged parallel to a substrate of the switchable retardation element (e.g., liquid crystals 102 are arranged parallel to substrates 104-1 and 104-2 in FIG. 1A). In some embodiments, the liquid crystals of the switchable retardation element are arranged substantially parallel to a substrate of the switchable retardation element.

In some embodiments, while the switchable retardation element is in the first state, the switchable retardation element maintains a polarization of the light transmitted through the switchable retardation element (e.g., FIG. 4A). While the switchable retardation element is in the second state, the switchable retardation element converts the polarization of the light transmitted through the switchable retardation element from a first circular polarization to a second circular polarization orthogonal to the first circular polarization (e.g., FIG. 4B).

In some embodiments, the electrical driver circuit provides the first voltage for placing the switchable retardation element in the first state at a first time and the electrical driver circuit provides the second voltage for placing the switchable retardation element in the second state at a second time distinct from the first time. In some embodiments, the electrical driver circuit forgoes providing the second voltage while providing the first voltage at the first time and the electrical driver circuit forgoes providing the first voltage while providing the second voltage at the second time.

In some embodiments, the second retardation angle is greater than the first retardation angle. In some embodiments, the second retardation angle is substantially 180 degrees and the first retardation angle is substantially zero degrees. In some embodiments, the second retardation angle is ranging from 165 degrees to 195 degrees, from 170 degrees to 190 degrees, or from 175 degrees to 185 degrees. In some embodiments, the first retardation angle is ranging from zero to two degrees, from zero to four degrees, from zero to six degrees, from zero to eight degrees, from zero to ten degrees, from zero to 12 degrees, from zero to 14 degrees, from zero to 16 degrees, from zero to 18 degrees, from zero to 20 degrees, from zero to five degrees, or from zero to 15 degrees.

In some embodiments, the liquid crystals are arranged in helical (e.g., chiral or twisted) structures while the switchable retardation element is in the second state. For example, liquid crystals 102 are arranged in helically shaped structures 110 having helical axes 110-1 perpendicular to substrates 104-1 and 104-2 in FIG. 1B.

In some embodiments, the switchable retardation element includes one or more alignment layers (e.g., alignment layers 108-1 and 108-2 in FIG. 1B) for arranging the liquid crystals in the helical structures while the switchable retardation element is in the second state.

In some embodiments, the second voltage has a value ranging from 1 V to 15 V. In some embodiments, the second voltage has a value ranging from 3 V to 10 V, from 4 V to 9 V, from 5 V to 8 V, or from 6 V to 7 V. In some embodiments, the second voltage has a value corresponding to substantially 5 V. In some embodiments, the second voltage has a value corresponding to substantially 6 V. In some embodiments, the second voltage has a value corresponding to substantially 7 V.

In some embodiments, the predefined frequency has a value ranging from 10 to 1000 Hz. In some embodiments, the predefined frequency has a value ranging from 10 to 900 Hz, from 10 to 800 Hz, from 10 to 700 Hz, from 10 to 600 Hz, from 10 to 500 Hz, from 10 to 400 Hz, from 10 to 300 Hz, from 10 to 200 Hz, from 10 to 100 Hz, from 10 to 90 Hz, from 10 to 80 Hz, from 10 to 70 Hz, from 20 to 100 Hz, from 30 to 100 Hz from 40 to 100 Hz, from 50 to 100 Hz, from 50 to 200 Hz, from 50 to 300 Hz, from 50 to 400 Hz, from 50 to 500 Hz, from 50 to 200 Hz, or from 50 to 150 Hz. In some embodiments, the predefined frequency is between 80 and 120 Hz. In some embodiments, the predefined frequency is 100 Hz. In some embodiments, the predefined frequency is between 30 and 90 Hz. In some embodiments, the predefined frequency is between 40 and 80 Hz. In some embodiments, the predefined frequency is between 50 and 70 Hz. In some embodiments, the predefined frequency is 60 Hz.

In accordance with some embodiments, an optical assembly includes the switchable optical retardation device described herein and a polarization-selective optical element optically coupled with the switchable optical retardation device (e.g., optical assembly 400 includes switchable retardation device 200 and polarization-selective optical element 402 in FIG. 4A). The optical assembly is for projecting, when the switchable optical retardation device is in the first state, light having a first polarization in a first direction (e.g., FIG. 4A) and projecting, when the switchable optical retarder is in the second state, light having a second polarization orthogonal to the first polarization, in a second direction distinct from the first direction (e.g., FIG. 4B).

In some embodiments, the polarization-selective optical element is a geometric phase optical element or a polarization volume holographic element. For example, polarization-selective optical element 402 in FIGS. 4A and 4B is a geometric phase optical element (e.g., Pancharatnam-Berry phase (PBP) grating 600 described with respect to FIGS. 6A-6D). For example, polarization-selective optical element 412 in FIGS. 4C and 4D is a polarization volume holographic element (e.g., polarization volume hologram (PVH) grating 500 described with respect to FIG. 5A-5D).

In accordance with some embodiments, an electrical driver circuit for operating a switchable optical retarder element includes a voltage modulator and one or more controllers for operating the voltage modulator (e.g., driver circuit 202 includes voltage modulator 106 and one or more controllers 204 in FIG. 2A). The voltage modulator is in electrical connection with the switchable optical retarder element (e.g., switchable retarder 100). The switchable optical retarder element includes liquid crystals and is switchable between different states including a first state and a second state (e.g., FIGS. 1A and 1B). While in the first state, the switchable retardation element modifies light transmitted through the switchable retardation element by causing a phase shift of a first retardation angle. While in the second state, the switchable retardation element modifies the light transmitted through the switchable retardation element by causing a phase shift of a second retardation angle distinct from the first retardation angle. The electrical driver circuit provides a first voltage for placing the switchable retardation element in the first state and a second voltage for placing the switchable retardation element in the second state. The first voltage is greater than the second voltage, the second voltage is a non-zero voltage, and the electrical driver circuit alternatingly provides the first voltage and the second voltage with a predefined frequency.

In accordance with some embodiments, a method for operating a switchable optical retarder element is performed at an electrical driver circuit (e.g., FIGS. 2A and 2B). The electrical driver circuit includes a voltage modulator and one or more controllers for operating the voltage modulator. The voltage modulator is in electrical connection with the switchable optical retarder element. The switchable optical retarder element includes liquid crystals and is switchable between different states including a first state and a second state. While in the first state, the switchable retardation element modifies light transmitted through the switchable retardation element by causing a phase shift of a first retardation angle. While in the second state, the switchable retardation element modifies the light transmitted through the switchable retardation element by causing a phase shift of a second retardation angle distinct from the first retardation angle. The method includes providing, by the electrical driver circuit, a first voltage for placing the switchable retardation element in the first state and a second voltage for placing the switchable retardation element in the second state. The first voltage is greater than the second voltage, the second voltage is a non-zero voltage, and the electrical driver circuit alternatingly provides the first voltage and the second voltage with a predefined frequency.

In some embodiments, the first retardation angle is substantially zero degrees and the second retardation angle is substantially 180 degrees. In some embodiments, the switchable retardation element is a half-wave plate (e.g., a switchable half-wave plate).

In some embodiments, while the switchable retardation element is in the first state, the liquid crystals of the switchable retardation element are arranged linearly along an electric field generated by the first voltage (e.g., FIG. 1A). In some embodiments, the liquid crystals of the switchable retardation element are arranged substantially linearly along an electric field generated by the first voltage. While the switchable retardation element is in the second state, the liquid crystals of the switchable retardation element are arranged parallel to a substrate of the switchable retardation element (e.g., FIG. 1B). In some embodiments, the liquid crystals of the switchable retardation element are arranged substantially parallel to a substrate of the switchable retardation element.

In some embodiments, while the switchable retardation element is in the first state, the switchable retardation element maintains a polarization of the light transmitted through the switchable retardation element (e.g., FIG. 4A). While the switchable retardation element is in the second state, the switchable retardation element converts the polarization of the light transmitted through the switchable retardation element from a first circular polarization to a second circular polarization orthogonal to the first circular polarization (e.g., FIG. 4B).

In some embodiments, the electrical driver circuit provides the first voltage for placing the switchable retardation element in the first state at a first time and the electrical driver circuit provides the second voltage for placing the switchable retardation element in the second state at a second time distinct from the first time.

In some embodiments, the second voltage has a value ranging from 1 V to 15 V. In some embodiments, the second voltage has a value ranging from 3 V to 10 V, from 4 V to 9 V, from 5 V to 8 V, or from 6 V to 7 V. In some embodiments, the second voltage has a value corresponding to substantially 5 V. In some embodiments, the second voltage has a value corresponding to substantially 6 V. In some embodiments, the second voltage has a value corresponding to substantially 7 V.

In some embodiments, the predefined frequency has a value ranging from 10 to 1000 Hz. In some embodiments, the predefined frequency has a value ranging from 10 to 900 Hz, from 10 to 800 Hz, from 10 to 700 Hz, from 10 to 600 Hz, from 10 to 500 Hz, from 10 to 400 Hz, from 10 to 300 Hz, from 10 to 200 Hz, from 10 to 100 Hz, from 20 to 100 Hz from 30 to 100 Hz from 40 to 100 Hz, from 50 to 100 Hz, from 50 to 200 Hz, from 50 to 300 Hz, from 50 to 400 Hz, or from 50 to 500 Hz. In some embodiments, the predefined frequency is 100 Hz. In some embodiments, the predefined frequency is 60 Hz.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A switchable optical retardation device, comprising:
    a switchable retardation element including liquid crystals and switchable between different states including a first state and a second state, wherein:
        while in the first state, the switchable retardation element modifies light transmitted through the switchable retardation element by causing a phase shift of a first retardation angle; and
        while in the second state, the switchable retardation element modifies the light transmitted through the switchable retardation element by causing a phase shift of a second retardation angle distinct from the first retardation angle; and
    an electrical driver circuit electrically coupled with the switchable optical retardation element for providing:
        a first voltage for placing the switchable retardation element in the first state; and
        a second voltage for placing the switchable retardation element in the second state, wherein:
            the first voltage is greater than the second voltage;
            the second voltage is a non-zero voltage; and
            the electrical driver circuit alternatingly provides the first voltage and the second voltage with a predefined frequency.

2. The switchable optical retardation device of claim 1, wherein:
    the first retardation angle is substantially zero degrees and the second retardation angle is substantially 180 degrees.

3. The switchable optical retardation device of claim 1, wherein:
    while the switchable retardation element is in the first state, the liquid crystals of the switchable retardation element are arranged linearly along an electric field generated by the first voltage; and
    while the switchable retardation element is in the second state, the liquid crystals of the switchable retardation element are arranged parallel to a substrate of the switchable retardation element.

4. The switchable optical retardation device of claim 1, wherein:
    while the switchable retardation element is in the first state, the switchable retardation element maintains a polarization of the light transmitted through the switchable retardation element; and
    while the switchable retardation element is in the second state, the switchable retardation element converts the polarization of the light transmitted through the switchable retardation element from a first circular polarization to a second circular polarization orthogonal to the first circular polarization.

5. The switchable optical retardation device of claim 1, wherein:
    the electrical driver circuit provides the first voltage for placing the switchable retardation element in the first state at a first time; and
    the electrical driver circuit provides the second voltage for placing the switchable retardation element in the second state at a second time distinct from the first time.

6. The switchable optical retardation device of claim 1, wherein:
    the second retardation angle is greater than the first retardation angle.

7. The switchable optical retardation device of claim 1, wherein:
    the liquid crystals are arranged in helical structures while the switchable retardation element is in the second state.

8. The switchable optical retardation device of claim 7, wherein:
    the switchable retardation element includes one or more alignment layers for arranging the liquid crystals in the helical structures while the switchable retardation element is in the second state.

9. The switchable optical retardation device of claim 1, wherein:
    the second voltage has a value ranging from 1 V to 15 V.

10. The switchable optical retardation device of claim 1, wherein:

the predefined frequency has a value ranging from 10-1000 Hz.

11. An optical assembly, comprising:

the switchable optical retardation device of claim 1; and a polarization-selective optical element optically coupled with the switchable optical retardation device, the optical assembly for:

projecting, when the switchable optical retardation device is in the first state, light having a first polarization in a first direction; and projecting, when the switchable optical retarder is in the second state, light having a second polarization orthogonal to the first polarization, in a second direction distinct from the first direction.

12. The optical assembly of claim 11, wherein:

the polarization-selective optical element is a geometric phase optical element or a polarization volume holographic element.

* * * * *